US012481998B2

United States Patent
Cheong

(10) Patent No.: US 12,481,998 B2
(45) Date of Patent: Nov. 25, 2025

(54) DEEP LEARNING BASED METHOD AND SYSTEM FOR DETECTING ABNORMAL CRYPTOCURRENCY TRANSACTION BETWEEN COMPUTING DEVICES IN A BLOCKCHAIN NETWORK

(71) Applicants: DUNAMU INC., Seoul (KR); LAMBDA256 INC., Seoul (KR)

(72) Inventor: Jae Young Cheong, Seoul (KR)

(73) Assignees: Dunamu Inc., Seoul (KR); Lambda256 Inc., Seoul (KR)

( * ) Notice: Subject to any disclaimer, the term of this patent is extended or adjusted under 35 U.S.C. 154(b) by 254 days.

(21) Appl. No.: 18/146,703

(22) Filed: Dec. 27, 2022

(65) Prior Publication Data
US 2023/0214845 A1 Jul. 6, 2023

(30) Foreign Application Priority Data
Dec. 30, 2021 (KR) ........................ 10-2021-0193353

(51) Int. Cl.
*G06Q 20/06* (2012.01)
*G06N 3/045* (2023.01)
(Continued)

(52) U.S. Cl.
CPC ......... *G06Q 20/4016* (2013.01); *G06Q 20/36* (2013.01)

(58) Field of Classification Search
CPC .. G06Q 20/4016; G06Q 20/36; G06Q 20/065; G06Q 20/382; H04L 9/50;
(Continued)

(56) References Cited

U.S. PATENT DOCUMENTS

2019/0012249 A1* 1/2019 Mercuri ................ H04L 63/123
2024/0235861 A1* 7/2024 Lavid Ben Lolo ....... H04L 9/50

FOREIGN PATENT DOCUMENTS

KR 10-2015-0005126 A 1/2015
KR 20150005126 A1 * 1/2015

OTHER PUBLICATIONS

Ahn et al., "Application of random over sampling Examples (Rose) for an Effective Bankruptcy Prediction Model" Journal of the Korea Contents Association, Aug. 28, 2018, vol. 18, No. 8, pp. 525-535.
(Continued)

*Primary Examiner* — Clifford B Madamba
(74) *Attorney, Agent, or Firm* — Knobbe, Martens, Olson & Bear, LLP

(57) ABSTRACT

The described technology relates to a deep learning based method and system for detecting abnormal cryptocurrency transaction between computing devices in a blockchain network. In once aspect, the method includes generating, at a server, a first data set, a second data set, and a third data set from the transactions of a user wallet address with at least one other user wallet address. The method may also include running a pre-learned deep learning module to extract a first feature vector, a second feature vector, and a third feature vector from the first data set, the second data set, and the third data set. The method may further include converting the first feature vector, the second feature vector, and the third feature vector into an intermediate value and comparing the intermediate value to a predetermined reference value to determine if a fraudulent transaction associated with the user wallet address has occurred.

20 Claims, 19 Drawing Sheets

(51) Int. Cl.
*G06N 3/0464* (2023.01)
*G06N 3/08* (2023.01)
*G06N 3/09* (2023.01)
*G06Q 20/36* (2012.01)
*G06Q 20/38* (2012.01)
*G06Q 20/40* (2012.01)
*H04L 9/00* (2022.01)
*H04L 67/1097* (2022.01)

(58) Field of Classification Search
CPC .. H04L 67/1097; G06N 3/045; G06N 3/0464; G06N 3/09; G06N 3/08
USPC .......................................................... 705/44
See application file for complete search history.

(56) References Cited

OTHER PUBLICATIONS

Gao et al., "Checking Smart Contracts with Structural Code Embedding", IEEE Transactions on Software Engineering, February 3. 2020, vol. 47, No. 12, pp. 2874-2891.
Hu et al., "The SCSGuard: Deep Scam Detection for Ethereum Smart Contracts", May 21, 2021, doi: 10.1109/INFOCOMWKSHPS54753.2022.9798296.
Siddique et al., "U-Net and Its Variants for Medical Image Segmentation: A Review of Theory and Applications", IEEE Access, Jun. 3, 2021, vol. 9, pp. 82031-82057.
Office Action received in Application No. KR 10-2021-0193353 dated Oct. 28, 2023 in 13 pages.

\* cited by examiner

FIG. 4

| From | Fund sender, an EOA (20-byte address) |
|---|---|
| To | Fund recipient, another EOA (20-byte address) |
| Value | Amount, in weis |
| Input code | Empty |
| Gas Limit | Larger enough for an ether transfer transaction |
| Gas Price | To be determined by transaction initiator |

<TRANSACTION DATA>

FIG. 5

| NUMBER OF TRANSACTIONS | LIFETIME OF WALLET ADDRESS (DIFFERENCE BETWEEN LAST TRANSACTION TIME AND FIRST TRANSACTION TIME) | TOTAL NUMBER OF COUNTERPART ADDRESSES (WITHOUT DUPLICATES) | TOTAL ETH TRANSMISSION AMOUNT |
|---|---|---|---|
| MAXIMUM ETH TRANSMISSION AMOUNT | MINIMUM ETH TRANSMISSION AMOUNT | AVERAGE ETH TRANSMISSION AMOUNT | ETH TRANSMISSION AMOUNT STANDARD DEVIATION |
| MAXIMUM TRANSACTION FEE | MINIMUM TRANSACTION FEE | AVERAGE TRANSACTION FEE | TRANSACTION FEE STANDARD DEVIATION |
| MAXIMUM TIMENS DIFFERENCE BETWEEN ADJACENT TRANSACTIO | MINIMUM TIMES DIFFERENCE BETWEEN ADJACENT TRANSACTION | AVERAGE TIME DIFFERENCE BETWEEN ADJACENT TRANSACTIONS | ADJACENT TRANSACTION TIME DIFFERENCE STANDARD DEVIATION |

<STATISTICAL FEATURE LIST>

FIG. 7

<T1: STATISTICAL FEATURE RECORD>

| WALLET ADDRESS | NUMBER OF TRANSACTIONS | LIFETIME OF WALLET | NUMBER OF SHIPPING ADDRESSES | TOTAL ETH TRANSMISSION AMOUNT | MAXIMUM ETH TRANSMISSION AMOUNT | MINIMUM ETH TRANSMISSION AMOUNT | AVERAGE ETH TRANSMISSION AMOUNT | ETH TRANSMISSION AMOUNT STANDARD DEVIATION | MAXIMUM TRANSACTION FEE | MINIMUM TRANSACTION FEE | AVERAGE TRANSACTION FEE | TRANSACTION FEE STANDARD DEVIATION | ADJACENT TRANSACTION MINIMUM TIME DIFFERENCE | ADJACENT TRANSACTION MAXIMUM TIME DIFFERENCE | ADJACENT TRANSACTION AVERAGE TIME DIFFERENCE | DIFFERENCE STANDARD DEVIATION BETWEEN ADJACENT TRANSACTIONS |
|---|---|---|---|---|---|---|---|---|---|---|---|---|---|---|---|---|
| 0x8F234b304 d325B5730ea 011380... | 4 | $1000^3$ | 3 | 0.8 | 0.3 | 0.1 | 0.2 | 0.071 | 0.011 | 0.001 | 0.0043 | 0.004 | 1000 | 1000 | 1000 | 1000 |

<T2: STATISTICAL FEATURE NORMALIZATION>

| WALLET ADDRESS | NUMBER OF TRANSACTIONS | LIFETIME OF WALLET | NUMBER OF SHIPPING ADDRESSES | TOTAL ETH TRANSMISSION AMOUNT | MAXIMUM ETH TRANSMISSION AMOUNT | MINIMUM ETH TRANSMISSION AMOUNT | AVERAGE ETH TRANSMISSION AMOUNT | ETH TRANSMISSION AMOUNT STANDARD DEVIATION | MAXIMUM TRANSACTION FEE | MINIMUM TRANSACTION FEE | AVERAGE TRANSACTION FEE | TRANSACTION FEE STANDARD DEVIATION | ADJACENT TRANSACTION MINIMUM TIME DIFFERENCE | ADJACENT TRANSACTION MAXIMUM TIME DIFFERENCE | ADJACENT TRANSACTION AVERAGE TIME DIFFERENCE | DIFFERENCE STANDARD DEVIATION BETWEEN ADJACENT TRANSACTIONS |
|---|---|---|---|---|---|---|---|---|---|---|---|---|---|---|---|---|
| 0x8F234b304 d325B5730ea 011380... | 0.004 | 1.0 | 0.003 | 0.0008 | 0.0003 | 9.99e-05 | 0.0002 | 7.09e-05 | 1.09e-05 | 0.0 | 4.2e-06 | 3.9e-06 | 1.0 | 1.0 | 1.0 | 1.0 |

FIG. 8

| WALLET ADDRESS | REMITTANCE FEATURE1 | REMITTANCE FEATURE2 | REMITTANCE FEATURE3 | REMITTANCE FEATURE4 | REMITTANCE FEATURE5 | COLLECTION FEATURE1 | COLLECTION FEATURE2 | COLLECTION FEATURE3 | COLLECTION FEATURE4 | COLLECTION FEATURE5 |
|---|---|---|---|---|---|---|---|---|---|---|
| 0x8F234b304 d325B5730ea 011380... | 10 | 32 | 2 | 0.1 | 11 | NONE | NONE | NONE | NONE | NONE |

<T31: RECORD BEFORE MISSING VALUE PROCESSING>

| WALLET ADDRESS | REMITTANCE FEATURE1 | REMITTANCE FEATURE2 | REMITTANCE FEATURE3 | REMITTANCE FEATURE4 | REMITTANCE FEATURE5 | COLLECTION FEATURE1 | COLLECTION FEATURE2 | COLLECTION FEATURE3 | COLLECTION FEATURE4 | COLLECTION FEATURE5 |
|---|---|---|---|---|---|---|---|---|---|---|
| 0x8F234b304 d325B5730ea 011380... | 10 | 32 | 2 | 0.1 | 11 | 0 | 0 | 0 | 0 | 0 |

<T32: RECORD AFTER MISSING VALUE PROCESSING>

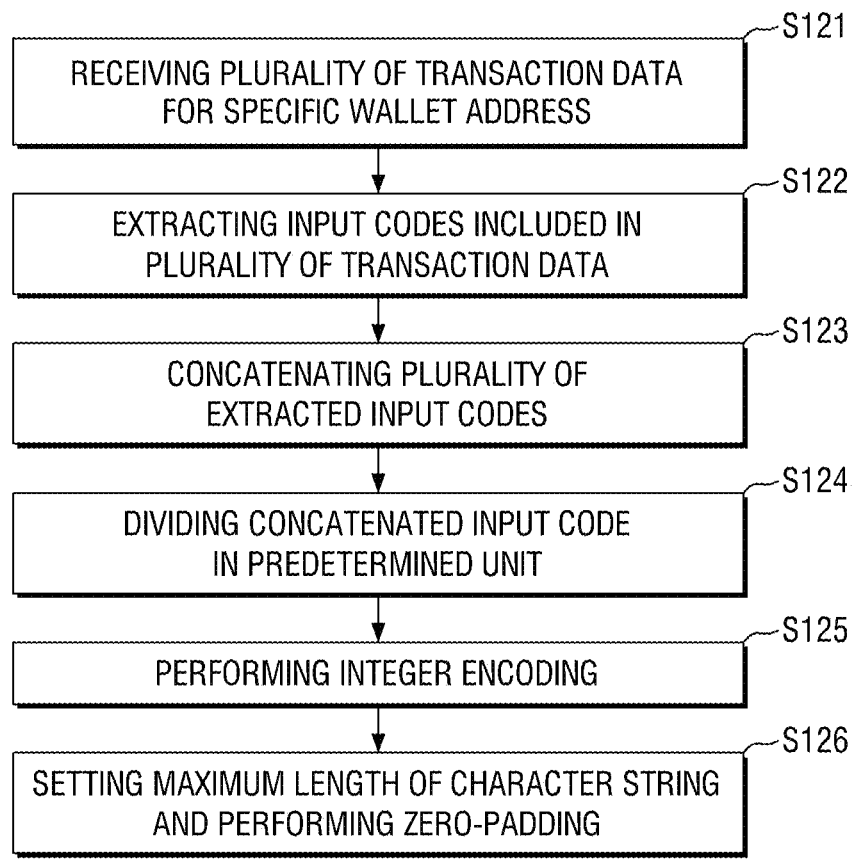

FIG. 11

| WALLET ADDRESS | INPUT CODE |
|---|---|
| 0x8F234b304d325B5730ea011380... | 0xasdf00x12300x454e34 |

<T41: CONCATENATION OF PLURALITY OF INPUT CODES>

| WALLET ADDRESS | INPUT CODE |
|---|---|
| 0x8F234b304d325B5730ea011380... | ['0xas', 'df00', 'x123', '00x4', '54e3', '4'] |

<T42: DIVISION OF CONCATENATED INPUT CODES>

| WALLET ADDRESS | INPUT CODE | INTEGER ENCODED INPUT CODE |
|---|---|---|
| 0xdAC17F958D2ee523a2206206994597C13D831ec7 | ['0xas', 'dfda', '01f'] | [3,1,2] |
| 0x3CBc780D2934d55A0669e837fABd3e6Fc23DAB0 | ['0xfa', '12fa', 'asdf', 'cxza', '1fd1', 'ad'] | [4,5,6,7,8,9] |
| 0x07b22fEB17011D057153bd1B74830801287bBcFF | ['0xfa', '12fa', 'as13', ... 'cazf', '3f23', '1a3d'] | [4,5,10,...,3212,1229,129] |

<T43: INTEGER ENCODING OF DIVIDED INPUT CODE>

FIG. 12

| WALLET ADDRESS | INTEGER ENCODED INPUT CODE |
|---|---|
| 0xasdf | [1,3] |
| 0xreqqi | [31,3,1] |
| 0xqf12 | [8,1] |

BEFORE ZERO-PADDING

| 1 | 3 |   |
|---|---|---|
| 31 | 3 | 1 |
| 8 | 1 |   |

AFTER ZERO-PADDING

| 1 | 3 | 0 |
|---|---|---|
| 31 | 3 | 1 |
| 8 | 1 | 0 |

<T44: SETTING MAXIMUM LENGTH OF CHARACTER STRING AND PERFORMING ZERO-PADDING>

Original Dataset  
<A11>

Generating Samples  
<A12>

Resampled Dataset  
<A13>

DEEP LEARNING BASED METHOD AND SYSTEM FOR DETECTING ABNORMAL CRYPTOCURRENCY TRANSACTION BETWEEN COMPUTING DEVICES IN A BLOCKCHAIN NETWORK

CROSS-REFERENCE TO RELATED APPLICATION

This application is based on and claims priority under 35 U.S.C. § 119 to Korean Patent Application No. 10-2021-0193353, filed on Dec. 30, 2021, in the Korean Intellectual Property Office, the disclosure of which is incorporated by reference herein in its entirety.

BACKGROUND

The described technology generally relates to a deep learning based method and system for detecting abnormal cryptocurrency transactions between computing devices in a blockchain network.

SUMMARY

One aspect is a fraud detection method based on deep learning using supervised learning specialized for cryptocurrency transaction.

Another aspect preprocess different types of data, respectively extract feature vectors based on the preprocessed data, and then use the extracted feature vectors to improve fraud detection performance.

Another aspect a fraud detection method that operates based on a deep learning module capable of improving fraud detection performance through learning.

The objects of the present disclosure are not limited to the above-mentioned objects, and other objects and advantages of the present disclosure not mentioned may be understood by the following description, and will be more clearly understood by the embodiments of the present disclosure. In addition, it will also be readily apparent that the objects and advantages of the present disclosure may be realized by the means and combinations thereof indicated in the appended claims.

Another aspect is a fraud detection method performed in a fraud detection server that collects transaction data of cryptocurrency, includes generating a first data set by deriving a plurality of statistical features based on the transaction data for a specific wallet address, performing a smart contract related to the wallet address and generating a second data set by using at least one input code included in the transaction data, generating a third data set by using a bytecode of a contract address used in response to distributing the smart contract, extracting first to third feature vectors with respect to the first to third data sets, respectively, by using a pre-learned deep learning module, and inferring whether there is any fraudulent transaction for the wallet address by using the extracted first to third feature vectors.

According to some aspects, the fraud detection method further includes, performing oversampling to increase a number of data for at least one data set among the first to third data sets, wherein the performing oversampling includes selecting a plurality of data included in the first to third data sets and adjacent to each other, and generating additional data by using synthetic minority oversampling technique (SMOTE) for the plurality of selected data.

According to some aspects, the performing oversampling includes performing the oversampling on the second data set and the third data set.

According to some aspects, the generating a first data set includes, receiving a plurality of transaction data for the wallet address, deriving different statistical features based on the plurality of transaction data, and performing normalization so that values of the derived statistical features are distributed between 0 and 1.

According to some aspects, the statistical features include, a first statistical feature generated based on the transaction data received in the wallet address, and a second statistical feature generated based on the transaction data transmitted from the wallet address.

According to some aspects, the generating a first data set further includes replacing a missing value with a predetermined value in response to the received transaction data or the transmitted transaction data does not exist, and thereby the missing value is generated in the first statistical feature or the second statistical feature.

According to some aspects, the generating a second data set includes, receiving a plurality of transaction data for the wallet address, extracting a plurality of input codes included in the plurality of transaction data, concatenating the plurality of extracted input codes, dividing the concatenated input codes into a predetermined unit, and performing integer encoding on the divided input code.

According to some aspects, the generating a second data set includes, adding a predetermined character to a character string in response to a length of the character string for each of the integer-encoded data is shorter than a predetermined maximum character string length, and deleting at least one part of the character string exceeding the maximum character string length from the character string in response to the length of the character string for each of the integer-encoded data is longer than the maximum character string length.

According to some aspects, the generating a third data set includes, extracting a bytecode related to the contract address, dividing the extracted bytecode into predetermined units, and performing integer encoding on the divided bytecode.

According to some aspects, the generating a third data set includes, adding a predetermined character to the character string in response to the length of the character string for each of the integer-encoded data is shorter than a predetermined maximum character string length, and deleting at least one part of the character string exceeding the maximum character string length from the character string in response to the length of the character string for each of the integer-encoded data is longer than the maximum character string length.

According to some aspects, the extracting first to third feature vectors includes, applying the first data set to a pre-learned convolutional neural network, applying maxpooling to a value that has passed through the convolutional neural network, and applying softmax function to a value that has passed through the maxpooling.

According to some aspects, the extracting first to third feature vectors includes, applying the second data set or the third data set to a first pre-learned convolutional neural network, applying first maxpooling to a value that has passed through the first convolutional neural network, applying the second data set to a second pre-learned convolutional neural network, applying second maxpooling to a value that has passed through the second convolutional neural network, applying softmax function to a value to which the second maxpooling is applied, and calculating an element-wise product of a first intermediate value to which the first maxpooling is applied and a second intermediate value to which the softmax function is applied.

According to some aspects, the fraud detection method, further includes, sequentially applying linear artificial neural network (ANN), rectified linear unit function (ReLU), and batch normalization to a result value of the element-wise product.

According to some aspects, the fraud detection method, further includes, sequentially applying linear artificial neural network (ANN) and leaky rectified linear unit function (Leaky ReLU) to a result value of the element-wise product.

According to some aspects, the inferring whether there is any fraudulent transaction includes, concatenating the first to third feature vectors, performing layer normalization on the concatenated first to third feature vectors, applying a layer normalized value to feed-forward network, deriving an intermediate value obtained by adding a value that has passed through the feed-forward network to the concatenated first to third feature vectors, and applying sigmoid function to the intermediate value and outputting a determination result for the fraudulent transaction.

As described above, the fraud detection method of the present disclosure preprocesses different types of data, and extracts and merges feature vectors based on the preprocessed data, thereby determining whether there is a fraudulent transaction. Therefore, the present disclosure may increase the accuracy of fraudulent transaction detection and reduce the risk of financial accidents related to cryptocurrency.

In addition, the fraud detection method of the present disclosure may increase the accuracy of fraud detection and improve the reliability of the cryptocurrency transaction by expanding the type and amount of data used to determine the fraudulent transaction and continuously learning the deep learning module based on the expanded data.

The specific effects of the present disclosure in addition to the above are described together while explaining the specific details for carrying out the present disclosure above.

Another aspect is a deep learning based method for detecting abnormal cryptocurrency transactions between computing devices in a blockchain network, the method comprising: establishing, by a communication interface of a fraud detection server, a communication link with a plurality of computing devices in the blockchain network, the plurality of computing devices comprising a first computing device associated with a first user wallet address and one or more second computing devices associated with one or more second user wallet addresses, the fraud detection server comprising a memory configured to store: one or more transaction data of transactions between the first user wallet address and at least one of the one or more second user wallet addresses, one or more input codes associated with the transactions between the first user wallet address and the at least one of the one or more second user wallet addresses, and one or more bytecodes associated with distributing the input code in the blockchain network; generating, by a processor of the fraud detection server, a first data set associated with the first user wallet address based at least in part on the transaction data, the first data set comprising a set of normalized statistical features of the transaction data; converting, by the processor, the input codes into a second data set associated with the first user wallet address, the second data set comprising a first set of integers; converting, by the processor, the bytecodes into a third data set associated with a contract address of the first user wallet address, the third data set comprising a second set of integers; running a pre-learned deep learning module of the processor using the first data set to extract a first feature vector; running the pre-learned deep learning module of the processor using the second data set to extract a second feature vector; running the pre-learned deep learning module of the processor using the third data set to extract a third feature vector; converting, by the processor, the first feature vector, the second feature vector, and the third feature vector into an intermediate value; comparing, by the processor, the intermediate value to a predetermined reference value stored in the memory; and determining, by the processor, a fraudulent activity in the transaction between the first wallet address and the at least one of the one or more second user wallet addresses based on a comparison result.

The above method further comprises: extracting, by the processor, the input codes from the transaction data and storing the input codes in the memory; and extracting, by the processor, the bytecodes from the transaction data and storing the bytecodes in the memory.

In the above method, the pre-learned module is configured to perform operations on the first data set, the second data set, and the third data set, based on at least one example fraud transaction.

The above method further comprises: performing, by the processor, oversampling to increase a number of data for at least one of the first data set, the second data set, or the third data sets, wherein the performing oversampling includes: selecting, by the processor, a plurality of data included in at least one of the first data set, the second data set, or the third data set, and generating, by the processor, additional data by using synthetic minority oversampling technique (SMOTE) for the plurality of selected data.

In the above method, performing oversampling includes performing the oversampling on the second data set and the third data set.

In the above method, generating the first data set comprises: retrieving, from the memory, the transaction data; deriving, by the processor, the set of statistical features based on the transaction data; and converting, by the processor, the set of statistical features into the set of normalized statistical features, the set of normalized statistical features comprising features distributed between 0 and 1.

In the above method, the set of statistical features comprises: a first statistical feature generated based on the transaction data of a retrieval transaction between the first user wallet address and the at least one of the one or more second user wallet addresses, and a second statistical feature generated based on the transaction data of a transmission transaction between the first user wallet address and the at least one of the one or more second user wallet addresses.

In the above method, generating the first data set further comprises replacing a missing value with a predetermined placeholder value in response to a lack of the retrieval transaction or the transmission transaction, and thereby the missing value is generated in the first statistical feature or the second statistical feature.

In the above method, converting the input codes into the second data set comprises: receiving, from the memory, a plurality of transaction data associated with the first user wallet address, extracting, by the processor, a plurality of input codes comprised in the plurality of transaction data, concatenating, by the processor, the plurality of input codes into a string, dividing, by the processor, the string by a predetermined unit to generate a divided string, performing, by the processor, integer encoding on the divided string, and inserting, by the processor, the result of integer encoding into the first set of integers.

In the above method, converting the input codes into the second data set further comprises: adding, by the processor, a predetermined character to the string in response to a length of the string being shorter than a predetermined maximum character string length, and deleting, by the processor, at least one part of the string in response to the length of the string being longer than the maximum character string length.

In the above method, converting the bytecodes into the third data set comprises: extracting, by the processor, a bytecode related to the contract address, dividing, by the processor, the extracted bytecode by a predetermined unit, performing, by the processor, integer encoding on the divided bytecode, and inserting, by the processor, the result of integer encoding into the second set of integers.

In the above method, converting the bytecodes into the third data set comprises: adding, by the processor, a predetermined character to the bytecodes to a length of the bytecodes being shorter than a predetermined maximum character string length, and deleting, by the processor, at least one part of the bytecodes in response to the length of the bytecodes being longer than the maximum character string length.

In the above method, running the pre-learned deep learning module of the processor using the first data set to extract the first feature vector comprises: applying, by the processor, the first data set to a pre-learned convolutional neural network, applying, by the processor, maxpooling to a value that has passed through the convolutional neural network, and applying, by the processor, a softmax function to a value that has passed through the maxpooling.

In the above method, running the pre-learned deep learning module of the processor using the second data set to extract the second feature vector comprises: applying, by the processor, the second data set to a first pre-learned convolutional neural network, applying, by the processor, a first maxpooling to a first value that has passed through the first convolutional neural network, applying, by the processor, the second data set to a second pre-learned convolutional neural network, applying, by the processor, a second maxpooling to a second value that has passed through the second convolutional neural network, applying, by the processor, a softmax function to a third value to which the second maxpooling is applied, and calculating, by the processor, an element-wise product of a first intermediate value to which the first maxpooling is applied and a second intermediate value to which the softmax function is applied.

In the above method, running the pre-learned deep learning module of the processor using the third data set to extract the third feature vector comprises: applying, by the processor, the third data set to a first pre-learned convolutional neural network, applying, by the processor, a first maxpooling to a first value that has passed through the first convolutional neural network, applying, by the processor, the third data set to a second pre-learned convolutional neural network, applying, by the processor, a second maxpooling to a second value that has passed through the second convolutional neural network, applying, by the processor, a softmax function to a third value to which the second maxpooling is applied, and calculating, by the processor, an element-wise product of a first intermediate value to which the first maxpooling is applied and a second intermediate value to which the softmax function is applied.

The above method further comprises sequentially applying, by the processor, a linear artificial neural network (ANN), a rectified linear unit function (ReLU), and a batch normalization to a result value of the element-wise product.

The above method further comprises sequentially applying, by the processor, a linear artificial neural network (ANN) and a leaky rectified linear unit function (Leaky ReLU) to a result value of the element-wise product.

In the above method, converting the first feature vector, the second feature vector, and the third feature vector into the intermediate value comprises: concatenating, by the processor, the first feature vector, the second feature vector, and the third feature vector into a concatenated vector; performing, by the processor, layer normalization on the concatenated vector, applying, by the processor, a layer normalized value to feed-forward network, and deriving, by the processor, the intermediate value obtained by adding a value that has passed through the feed-forward network to the concatenated vector.

Another aspect is a system for detecting abnormal cryptocurrency transactions between computing devices in a blockchain network, the system comprising: a communication interface configured to establish a communication link with a plurality of computing devices in the blockchain network, the plurality of computing devices comprising a first computing device associated with a first user wallet address and one or more second computing devices associated with one or more second user wallet addresses; a memory configured to store: one or more transaction data of transactions between the first user wallet address and at least one of the one or more second user wallet addresses, one or more input codes associated with the transactions between the first user wallet address and the at least one of the one or more second user wallet addresses, and one or more bytecodes associated with distributing the input code in the blockchain network; and a processor configured to: generate a first data set associated with the first user wallet address based at least in part on the transaction data, the first data set comprising a set of normalized statistical features of the transaction data; convert the input codes into a second data set associated with the first user wallet address, the second data set comprising a first set of integers; convert the bytecodes into a third data set associated with the first user wallet address, the third data set comprising a second set of integers; run a pre-learned deep learning module using the first data set to extract a first feature vector; run the pre-learned deep learning module using the second data set to extract a second feature vector; run the pre-learned deep learning module using the third data set to extract a third feature vector; convert the first feature vector, the second feature vector, and the third feature vector into an intermediate value; compare the intermediate value to a predetermined reference value stored in the memory; and determine a fraudulent activity in the transaction between the first wallet address and the at least one of the one or more second user wallet addresses based on a comparison result.

Another aspect is a non-transitory computer-readable recording medium storing instructions, when executed by one or more processors, configured to perform one or more of the above methods.

BRIEF DESCRIPTION OF THE DRAWINGS

FIG. 4 is a diagram illustrating a configuration of transaction data used in the statistical feature preprocessor of FIG. 2.

FIG. 5 is a diagram illustrating statistical features derived from the statistical feature preprocessor of FIG. 2.

FIGS. 6 to 8 are diagrams for exemplarily explaining the operation of the statistical feature preprocessor of FIG. 3.

FIG. 9 is a flowchart illustrating an operation of an input code preprocessor of FIG. 2.

FIGS. 10 to 12 are diagrams for exemplarily explaining the operation of the input code preprocessor of FIG. 9.

DETAILED DESCRIPTION

Figure 1:
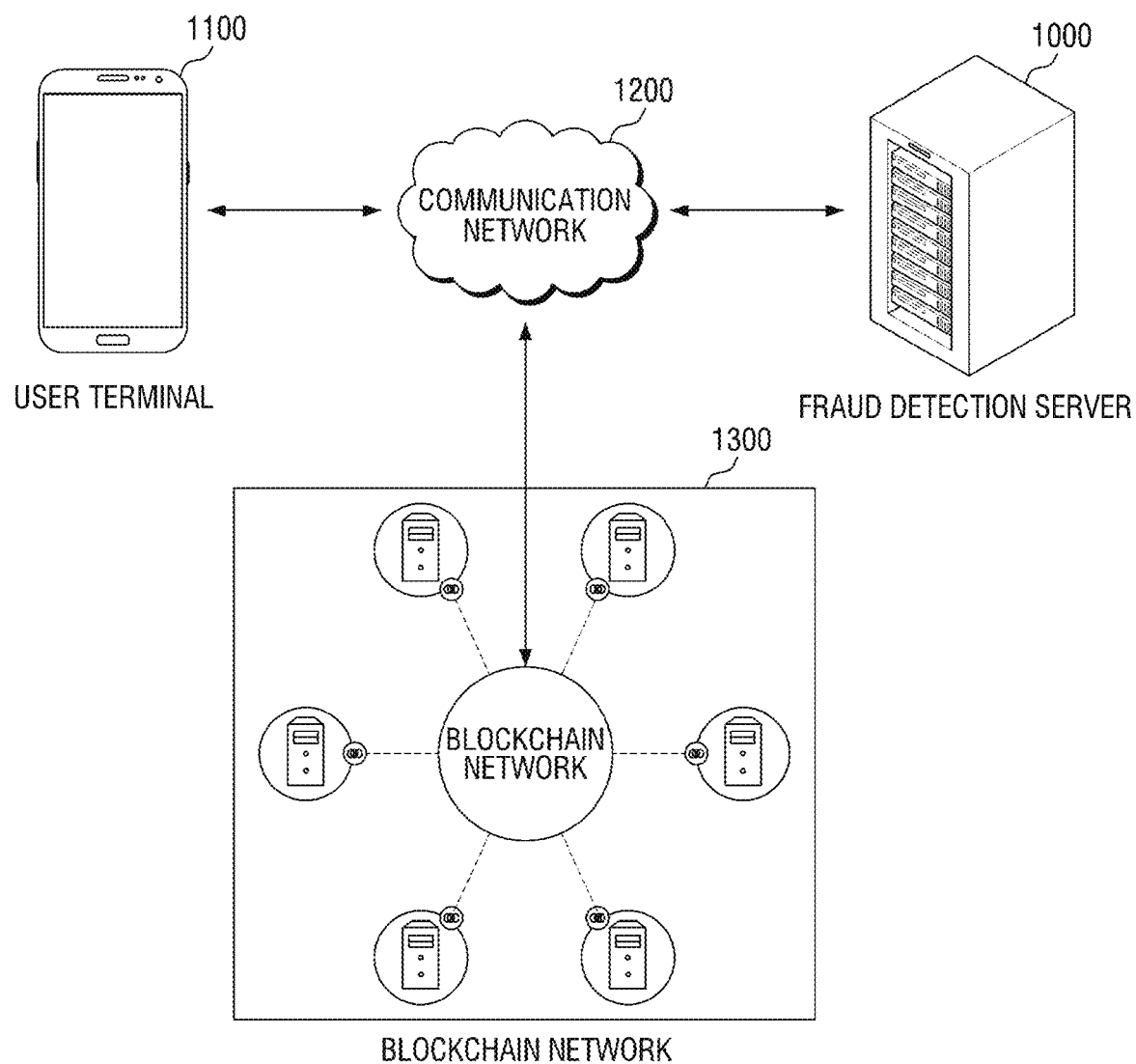
FIG. 1 is a schematic diagram illustrating a fraud detection system based on deep learning according to some embodiments of the present disclosure.

Most of financial-related companies are building and operating a fraud detection system (FDS) to respond to electronic financial fraud. The fraud detection system determines whether an arbitrary address (account) or transaction is similar to a fraud pattern. However, since most of the conventional fraud detection systems use a predetermined rule to determine whether there is a fraudulent transaction, there is a limitation in that the continuously changing fraud pattern cannot be updated without human intervention.

In addition, a number of recent studies have introduced that it is possible to construct a fraud detection system with better performance when using a machine learning-based approach than the conventional rule-based approach. Moreover, the fraud detection system for cryptocurrency has a different type of data from the data handled when constructing the fraud detection system in the conventional financial sector. For example, transaction data for Ethereum includes various data generated when a sender of Ethereum generates a transaction, and this data is data that has not been generated in existing financial transaction.

Therefore, in the study and disclosure of the conventional fraud detection system, consideration for the fraud detection specialized for the cryptocurrency is counterpartly insufficient.

Advantages and features of the present disclosure and methods of achieving them will become apparent with reference to the embodiments described below in detail in conjunction with the accompanying drawings. However, the present disclosure is not limited to the embodiments disclosed below, and will be implemented in a variety of different forms, only these embodiments allow the disclosure of the present disclosure to be complete, and is provided to fully inform those of ordinary skill in the art to which the present disclosure belongs of the scope of the disclosure. The present disclosure is only defined by the scope of the claims. Like reference numerals refer to like elements throughout of the specification.

The terminology used herein is for the purpose of describing the embodiments and is not intended to limit the present disclosure. In the present specification, the singular also includes the plural unless specifically stated otherwise in the phrase. As used herein, terms such as "comprise", "have", "include", "contain" etc. do not exclude the presence or addition of one or more other components, steps, operations and/or elements in addition to components, steps, operations and/or elements which are mentioned.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms (including technical and scientific terms) used in the present specification may be used with the meaning commonly understood by those of ordinary skill in the art to which the present disclosure belongs. In addition, terms defined in a commonly used dictionary are not to be interpreted ideally or excessively unless specifically defined explicitly.

Hereinafter, a fraud detection method based on deep learning according to some embodiments of the present disclosure will be described with reference to FIGS. 1 to 22.

FIG. 1 is a schematic diagram illustrating a fraud detection system based on deep learning according to some embodiments of the present disclosure.

Referring to FIG. 1, the fraud detection method according to some embodiments of the present disclosure is performed by a fraud detection server 100. The fraud detection server 100 may operate in association with a user terminal 1100 and a blockchain network 1300 via a communication network 1200.

The fraud detection server 1000 may provide various cryptocurrency (or virtual currency)-related transaction services to the user terminal 1100. In this case, the cryptocurrency-related transaction service may include services such as buy, sell, deposit, withdrawal, and transfer for cryptocurrency.

On the other hand, cryptocurrency using a blockchain may be mined, recorded, and transmitted within the blockchain network 1300. Here, the cryptocurrency using the blockchain may include bitcoin, ethereum (hereinafter, ETH), and the like.

In addition, the reception, transmission, exchange, or the like of the cryptocurrency within the blockchain network 1300 may be defined or processed as a blockchain transaction. The blockchain transaction may be converted via a hash function, created as a value of an arbitrary length, and stored or processed in a block.

On the other hand, a smart contract may be a script that operates based on the blockchain and implements a written contract as a code so that the contract is executed when certain conditions are met.

The fraud detection server 1000 of the present disclosure may detect whether there is a user's fraudulent transaction based on a blockchain transaction (hereinafter referred to as a transaction) related to a wallet address held by the user, an input code that is included in each transaction and serves as a factor for performing a smart contract, and a contract bytecode (hereinafter referred to as a bytecode) used in the distribution of the smart contract.

Specifically, the fraud detection server 1000 performs a fraud detection method based on deep learning using a supervised learning methodology. For example, when the wallet address of the virtual currency (for example, Ethereum) is input, the fraud detection server 1000 determines how similar data related to the wallet address is to the fraud pattern by a pre-learned machine learning model, and then returns a risk assessment score of the corresponding wallet address.

The fraud detection server 1000 may learn the fraud detection model using a supervised data set (that is, a data set to which a label value for abnormality of each data is assigned). In this case, the supervised data set for the purpose of detecting whether there is a fraudulent transaction may be configured as follows. In a label column in [Table 1] below, 1 may mean a fraudulent transaction, and 0 may mean a normal transaction.

TABLE 1

| Wallet address of virtual currency | Statistical feature | Input code | Bytecode | Label value |
|---|---|---|---|---|
| 0xD854526EA2E285666C9d35D2Da3C07D514DB90a7 | ... | ... | ... | 0 |
| 0x395604F1Db081376D0FE5dC9F154d0946065CcAb | ... | ... | ... | 1 |
| 0xd6CfD617103649A2F72DF3C7A89ff246836bFC08 | ... | ... | ... | 1 |

A method of pre-processing a data set used for detecting the fraudulent transaction in the fraud detection server 1000 or a method of determining whether there is the fraudulent transaction is performed will be described later in detail.

On the other hand, in the present disclosure, the fraud detection server 1000 and the user terminal 1100 may be implemented as a server-client system. The fraud detection server 1000 may store and manage user's subscription name information, wallet address, transaction information and smart contract information in each customer account, and provide various services related to cryptocurrency via a cryptocurrency transaction application installed in the user terminal 1100.

In this case, the cryptocurrency application may be a dedicated application for providing the cryptocurrency service or a web browsing application. Here, the dedicated application may be an application embedded in the user terminal 1100 or an application downloaded from an application distribution server and installed in the user terminal 1100.

On the other hand, the user terminal 1100 refers to a communication terminal capable of operating a plurality of applications in a wired/wireless communication environment. In FIG. 1, the user terminal 1100 is illustrated as a smart phone, which is a type of portable terminal, but the present disclosure is not limited thereto, and may be applied without limitation to a device capable of operating the cryptocurrency application or the SNS application as mentioned above. For example, the user terminal 1100 may include various types of electronic devices, such as a personal computer (PC), a notebook computer, a tablet, a mobile phone, a smart phone, and a wearable device (for example, a watch-type terminal).

On the other hand, the communication network 1200 serves to connect the fraud detection server 1000, the user terminal 1100, and the blockchain network 1300. The communication network 1200 may include, for example, a wired network such as Local Area Networks (LANs), Wide Area Networks (WANs), Metropolitan Area Networks (MANs) or Integrated Service Digital Networks (ISDNs), a wireless network such as wireless LANs, CDMA, Bluetooth or satellite communication, and the like, but the scope of the present disclosure is not limited thereto.

Hereinafter, a fraud detection method based on deep learning according to some embodiments of the present disclosure will be described in detail.

Figure 2:
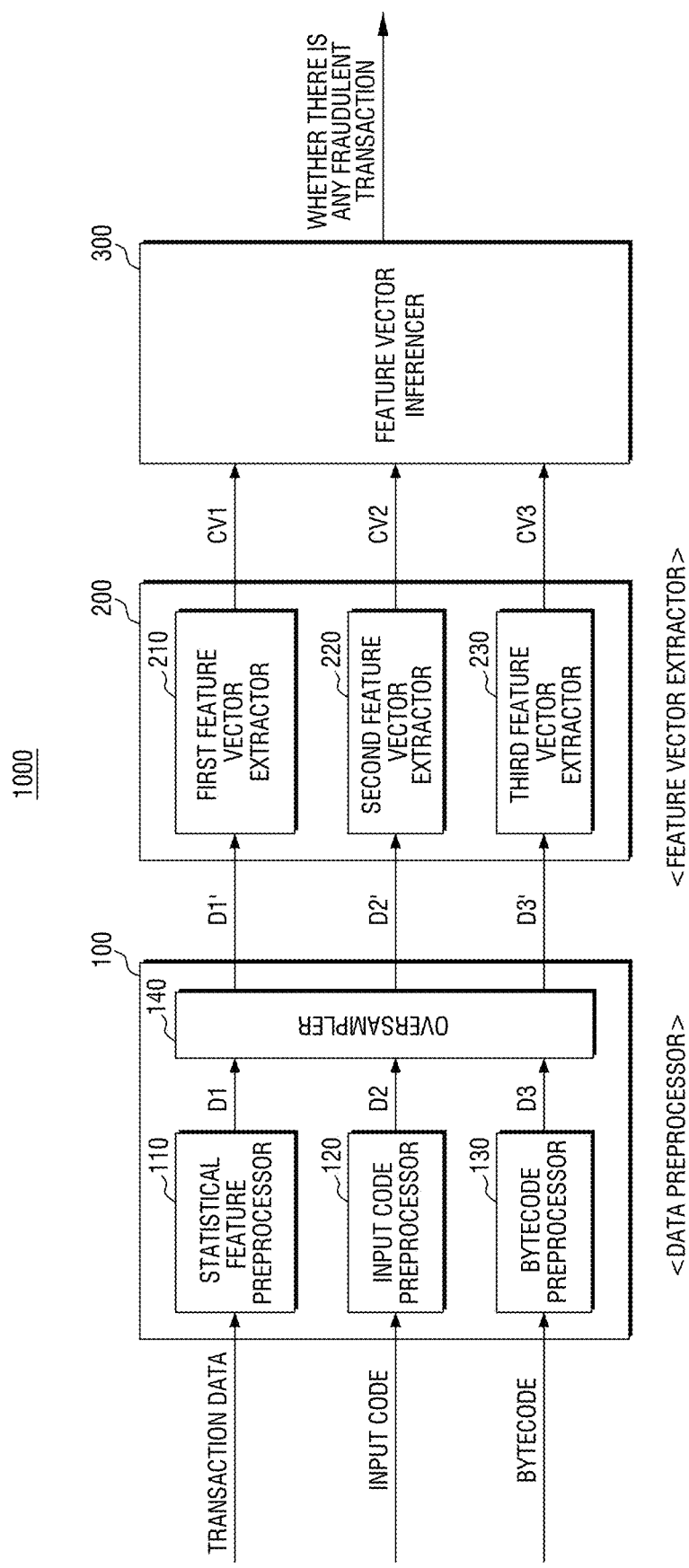
FIG. 2 is a block diagram illustrating components for performing a fraud detection method in a fraud detection server of FIG. 1.

FIG. 2 is a block diagram illustrating components for performing the fraud detection method in the fraud detection server of FIG. 1.

Referring to FIG. 2, the fraud detection server 1000 according to some embodiments of the present disclosure includes a data preprocessor 100, a feature vector extractor 200, and a feature vector inferencer 300. The data preprocessor 100, the feature vector extractor 200, and the feature vector inference 300 may be implemented by at least one processor. However, the present disclosure is not limited thereto.

The data preprocessor 100 receives transaction data for a specific user's wallet address, an input code included in the transaction data, and a bytecode included in the smart contract used by the user. The data preprocessor 100 pre-processes the received transaction data, input code, and bytecode, respectively, and outputs first to third data sets D1', D2', and D3'.

Specifically, the data preprocessor 100 includes a statistical feature preprocessor 110, an input code preprocessor 120, and a bytecode preprocessor 130. In addition, in an embodiment of the present disclosure, the data preprocessor 100 may further include an oversampler 140. However, the present disclosure is not limited thereto, and in another embodiment of the present disclosure, it goes without saying that the data preprocessor 100 may be performed in a configuration without the oversampler 140. However, for convenience of explanation, the following description will be given by taking as an example that the data preprocessor 100 includes the oversampler 140.

Hereinafter, first, an operation of the statistical feature preprocessor 110 will be described in detail.

Figure 3:
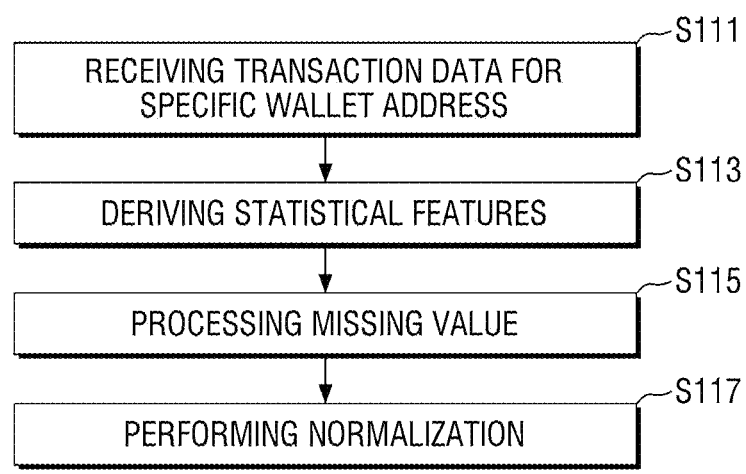
FIG. 3 is a flowchart illustrating an operation of a statistical feature preprocessor of FIG. 2.

FIG. 3 is a flowchart illustrating the operation of the statistical feature preprocessor of FIG. 2. FIG. 4 is a diagram illustrating a configuration of transaction data used in the statistical feature preprocessor of FIG. 2. FIG. 5 is a diagram illustrating statistical features derived from the statistical feature preprocessor of FIG. 2. Hereinafter, for convenience of explanation, it will be described that the cryptocurrency is Ethereum (ETH; hereinafter, ETH) as an example.

First, referring to FIG. 3, the statistical feature preprocessor 110 receives transaction data for a specific wallet address (S111). In this case, the statistical feature preprocessor 110 generates a data set including a plurality of statistical features using the transaction data. Transaction data is data generated in response to the ETH is transmitted from a sender to a recipient, and one transaction data may be generated in response to the ETH is transmitted once.

For example, referring to FIG. 4, the transaction data may include items of the sender, the recipient, a transmission amount, an input code, a gas limit, a gas price, and the like.

Next, the statistical feature preprocessor 110 derives the statistical features based on the received transaction data (S113). In this case, the statistical features generated by the statistical feature preprocessor 110 may be generated based on transaction data exchanged at a specific wallet address.

For example, the statistical feature preprocessor 110 may calculate 16 kinds of statistical features disclosed in FIG. 5 based on the transaction data received from a specific wallet address. In addition, it is possible to calculate 16 kinds of statistical features disclosed in FIG. 5 based on the transaction data transmitted from a specific wallet address. That is, 16 kinds of statistical features are calculated based on the transaction data received at the specific wallet address, and 16 statistical features are calculated based on the transaction data transmitted from the specific wallet address, so that total 32 statistical features may be calculated at the specific wallet address.

Hereinafter, for example, each item of each statistical feature derived from the statistical feature preprocessor 110 will be described with reference to FIGS. 6 to 8.

Figure 6:
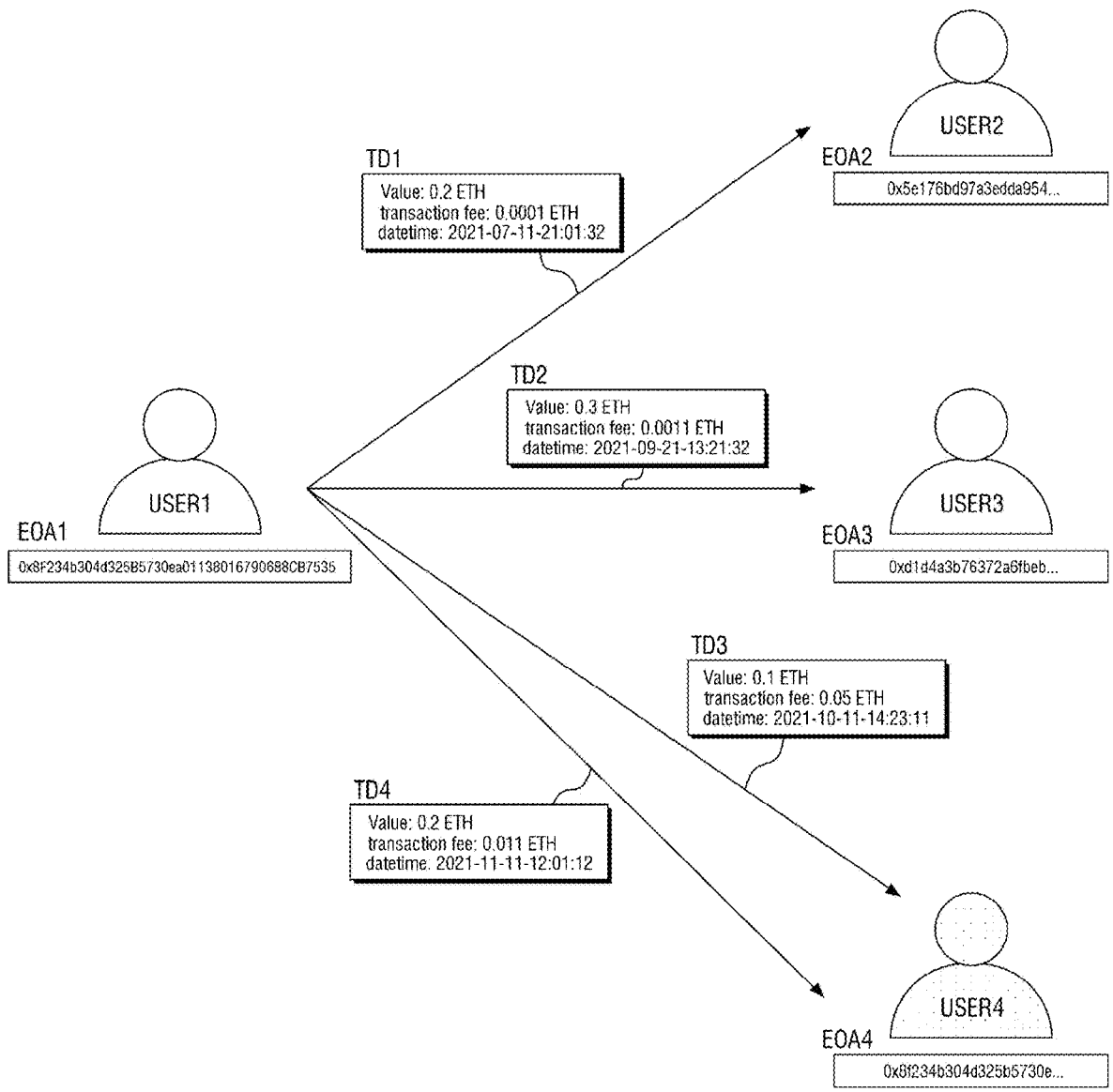

FIGS. 6 to 8 are diagrams for exemplarily explaining the operation of the statistical feature preprocessor of FIG. 3.

Referring to FIG. 6, a first user USER1 performs four transactions to three other users USER2, USER3, and USER4 to remit the ETH. For example, hereinafter, it will be described a case, as an example, in which the first user USER1 performs total 4 remittances of remittance once to the second user USER2, once to the third user USER3, and twice to the fourth user USER4. In this case, the statistical feature preprocessor 110 may derive the following 16 statistical features (see each item in FIG. 5) based on the remittance transaction data of the first user USER1.

(1) Number of transactions: since the first user USER1 has generated 4 remittance transactions, the number of transactions is 4.

(2) Lifetime of wallet address: it indicates a difference between the time of the first transaction and the time of the most recent transaction after a specific wallet address was created. In FIG. 6, the first transaction time by the first user USER1 is "2021-07-11-21:01:32" in response to the first transaction TD1 is sent to the second user USER2, and the last transaction time is "2021-11-11-12:01:12" in response to the fourth transaction TD4 is sent to the fourth user USER4. The lifetime of the wallet address is a value obtained by converting the derived time difference into minutes.

(3) Total number of counterpart addresses (without duplicates): since the first user USER1 remitted to three users including the second user USER2, the third user USER3, and the fourth user USER4, the total number of counterpart addresses is 3.

(4) Total ETH transmission amount: since the first user USER1 sent 0.2 ETH, 0.3 ETH, 0.1 ETH, and 0.2 ETH for each transaction, the total ETH transmission amount is 0.8.

(5) Maximum ETH transmission amount: since the first user USER1 sent 0.2 ETH, 0.3 ETH, 0.1 ETH, and 0.2 ETH for each transaction, and the largest value among them is 0.3, the maximum ETH transmission amount is 0.3.

(6) Minimum ETH transmission amount: since the first user USER1 sent 0.2 ETH, 0.3 ETH, 0.1 ETH, and 0.2 ETH for each transaction, and the smallest value among them is 0.1, the minimum Ether transmission amount is 0.1.

(7) Average ETH transmission amount: since the first user USER1 sent 0.2 ETH, 0.3 ETH, 0.1 ETH, and 0.2 ETH for each transaction, and the average value of these values is 0.2, the average ETH transmission amount is 0.2.

(8) ETH transmission amount standard deviation: since the first user USER1 sent 0.2 ETH, 0.3 ETH, 0.1 ETH, and 0.2 ETH for each transaction, and the standard deviation of these values is about 0.071, the standard deviation of the Ether transmission amount is 0.071.

(9) Maximum transaction fee: since the first user USER1 paid a transaction fee of 0.0001 ETH, 0.0011 ETH, 0.005 ETH, and 0.011 ETH for each transaction, and the largest of these values is 0.011, the maximum transaction fee is 0.011.

(10) Minimum transaction fee: since the first user USER1 paid the transaction fee of 0.0001 ETH, 0.0011 ETH, 0.05 ETH, and 0.011 ETH for each transaction, and the smallest of these values is 0.0001, the minimum transaction fee is 0.0001.

(11) Average transaction fee: since the first user USER1 paid the transaction fee of 0.0001 ETH, 0.0011 ETH, 0.05 ETH, and 0.011 ETH for each transaction, and the average value of these values is 0.0043, the average transaction fee is 0.0043.

(12) Transaction fee standard deviation: since the first user USER1 paid the transaction fee of 0.0001 ETH, 0.0011 ETH, 0.05 ETH, and 0.011 ETH for each transaction, and the standard deviation of these values is about 0.004, the transaction fee standard deviation is 0.004.

(13) Maximum time difference between adjacent transactions: among all transactions of a specific wallet address, it means the maximum value of time differences between a random transaction and the transaction that occurred immediately before the random transaction. Accordingly, the time difference between three adjacent transactions may be obtained from the four transactions transmitted by the first user USER1, and the largest value among these values becomes the maximum time difference between adjacent transactions. The maximum time difference between adjacent transactions is a value obtained by converting the derived maximum time difference into minutes.

(14) Minimum time difference between adjacent transactions: among all transactions of a specific wallet address, it means the minimum value of the time differences between a random transaction and the transaction that occurred immediately before the random transaction. Accordingly, the time difference between three adjacent transactions may be obtained from the four transactions transmitted by the first user USER1, and the smallest value among these values becomes the minimum time difference between adjacent transactions. The minimum time difference between adjacent transactions is a value obtained by converting the derived minimum time difference into minutes.

(15) Average time difference between adjacent transactions: among all transactions of a specific wallet address, it means the average value of the time difference values between a random transaction and the transaction that occurred immediately before the random transaction. Accordingly, the time difference between three adjacent transactions may be obtained from the four transactions transmitted by the first user USER1, and the average value of these values becomes the average time difference between the adjacent transactions. The average time difference between adjacent transactions is a value obtained by converting the derived average time into minutes.

(16) Adjacent transaction time difference standard deviation: among all transactions of a specific wallet address, it means the standard deviation of the time difference values between a random transaction and the transaction that occurred immediately before the random transaction.

Accordingly, the time difference between three adjacent transactions may be obtained from the four transactions transmitted by the first user USER1, and the standard deviation of these values becomes the standard deviation of the time difference between adjacent transactions. The time difference standard deviation between adjacent transactions is a value obtained by converting the derived average time into minutes.

Through the above process, the statistical features derived from the statistical feature preprocessor 110 may be grouped into one record in association with the corresponding wallet address as illustrated in the table T1 of FIG. 7. The statistical feature preprocessor 110 may store the derived statistical features in a database in association with the corresponding wallet address.

Next, referring again to FIG. 3, the statistical feature preprocessor 110 normalizes the statistical feature values associated with the corresponding wallet address (S117). For example, the statistical feature preprocessor 110 may change the values of the statistical feature to values between 0 and 1 using Min-Max Normalization.

Specifically, the statistical feature preprocessor 110 may normalize the values of the statistical features using [Equation 1] below.

$$x'_i = \frac{x_i - \min(x)}{\max(x) - \min(x)} \quad \text{[Equation 1]}$$

Here, x may be a set of values of statistical features associated with the wallet address.

As the normalization is performed, the values of the statistical features associated with the wallet address (for example, T1 in FIG. 7) may be changed to values between 0 and 1 (for example, T2 in FIG. 7) to be used.

Additionally, in response to only a remittance transaction exists or only a reception transaction exists in a specific wallet address, the statistical feature preprocessor 110 may have a missing value for an item that does not exist.

For example, referring to T31 of FIG. 8, in response to only the remittance transaction exists and no reception transaction exists at a specific wallet address, the values assigned to the collection feature 1 to the collection feature 5 are treated as missing values. In this case, the statistical feature preprocessor 110 may perform missing value processing by replacing the values processed as missing values (none) in the corresponding wallet address with 0 (S115 in FIG. 3). Therefore, the statistical feature preprocessor 110 may set the sizes of the statistical features assigned to a specific wallet address to be the same.

The missing value processing step S115 performed by the statistical feature preprocessor 110 may be performed between the statistical feature deriving step S113 and the normalization performing step S117. However, the present disclosure is not limited thereto, and it goes without saying that the missing value processing step S115 may be performed after the normalization performing step S117 or may be omitted.

That is, the statistical feature preprocessor 110 may generate a data set including 32 statistical features using transaction data for a specific user's wallet address.

Hereinafter, an operation of the input code preprocessor 120 included in the data preprocessor 100 will be described.

Figure 10:
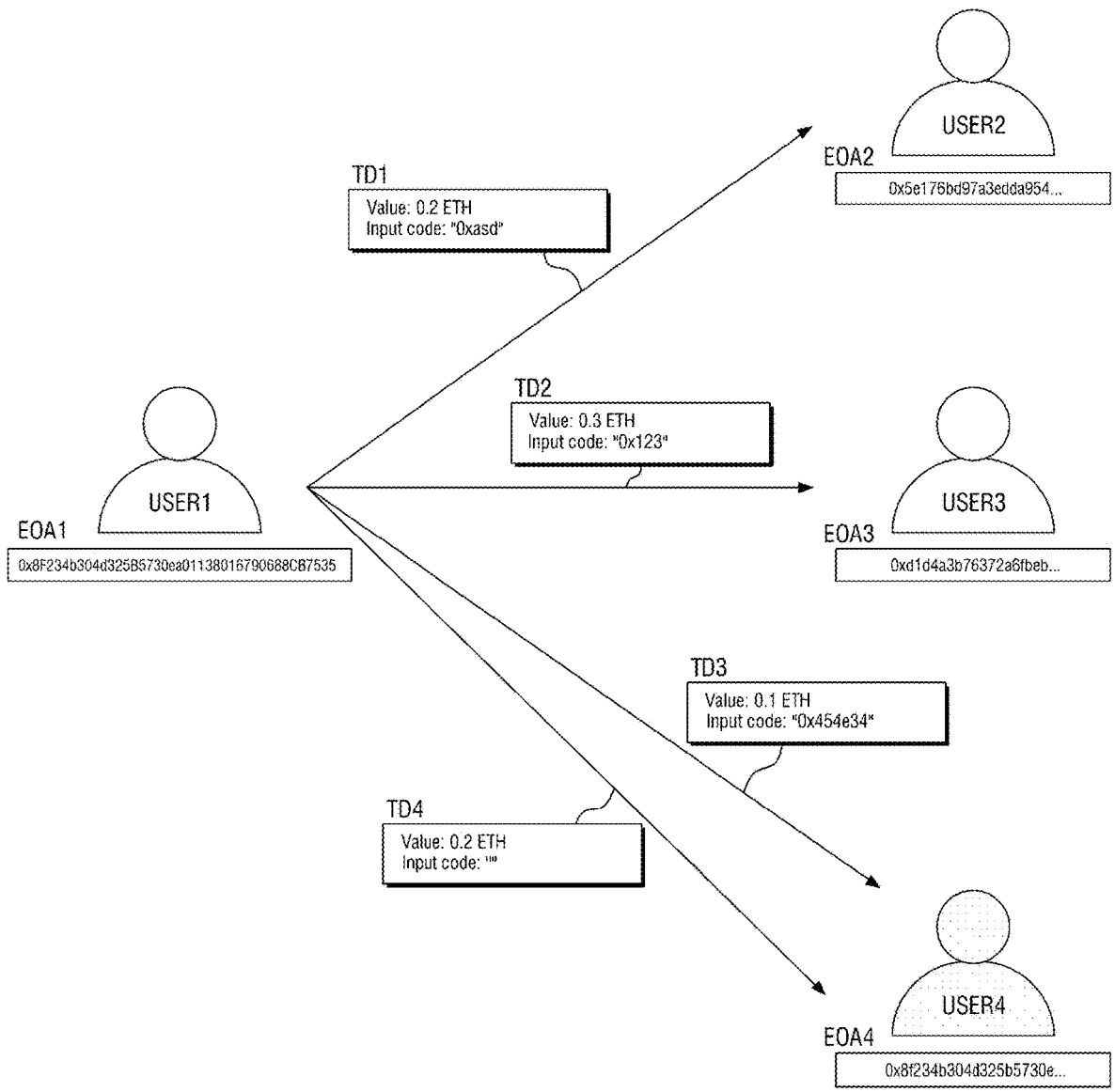

FIG. 9 is a flowchart illustrating the operation of the input code preprocessor of FIG. 2. FIGS. 10 to 12 are diagrams for exemplarily explaining the operation of the input code preprocessor of FIG. 9.

Referring to FIG. 9, the input code preprocessor 120 generates a data set using the input code included in the transaction for a specific wallet address.

To this end, the input code preprocessor 120 first receives a plurality of transaction data for a specific wallet address (S121).

Then, the input code preprocessor 120 extracts the input code included in the plurality of transaction data (S122). Here, the input code means a code that may be included as a factor for performing a smart contract in the transaction. Unlike the contract bytecode (hereinafter, bytecode) used in response to deploying the smart contract, the input code may exist for every transaction.

Specifically, the input code means a character string obtained through a series of processes after an owner having an externally owned address (EOA) or a contract address (hereinafter, CA) sends a message (that is, transaction) to any contract address as a message transmitter (message sender), and writes which function to use in the contract and which parameter to input to execute the function in the data field (input data) in the transaction for the purpose of performing the contract written at the address.

For example, the input code may be generated in the following way.

(1) When sending a transaction to the contract address (CA), the transmitter inputs which function in the contract to use and which parameter to transmit to the function.

(2) To specify which function to use, input character string type information is converted by using a cryptographic hash algorithm (Keccak-256).

(3) Only first 4 bytes are extracted from the converted code.

(4) If the factor to be transmitted to the selected function is the amount of the ETH, the value is converted into Wei in unit. If the input factor is a numeric value, the value is used as it is, and if the input factor is a character string, the value is converted into a bytecode.

(5) The value obtained in (4) is converted to hexadecimal, and encodes as a serialized, unsigned Big Endianness 256-bit integer.

(6) By concatenating the results of (3) and (5), the input code is generated.

However, the method of generating the input code used in the present disclosure is not limited to the above example, and it goes without saying that it may be modified and used in various ways.

The input code preprocessor 120 extracts the input code generated in the above method and included in the transaction data, and in response to there is a plurality of transaction data, extracts the input code for each transaction data.

Next, the input code preprocessor 120 concatenates the plurality of extracted input codes (S123).

For example, referring to FIG. 10, three input codes may exist in four transmission transactions TD1, TD2, TD3, and TD4 of the first user USER1. In this case, the input code may be extracted except for the case of the fourth transaction TD4 in which the input code does not exist during the transaction.

The input code preprocessor 120 concatenates input codes extracted from a plurality of transactions. For example, referring to T41 in FIG. 11, the input code preprocessor 120 concatenates a first input code Oxasdf of the first transaction TD1, a second input code Ox123 of the second transaction TD2, and a third input code Ox454e34 of the third transaction TD3. In this case, the input code preprocessor 120 may combine the plurality of input codes into one character string by inserting a predetermined character (for example, 0)

between the plurality of input codes. In this case, the order of concatenating the input codes may be determined by sorting according to a predetermined criterion (for example, the transaction creation time).

Next, the input code preprocessor 120 divides the concatenated input code in a predetermined unit (S124). Here, the predetermined unit n may be set to a natural number of 2 or more. For example, referring to T42 in FIG. 11, in response to the predetermined unit is 4 (that is, n=4), the concatenated input codes may be divided into 'Oxas', 'df00', 'x123', '00x4', '54e3', and '4'.

Next, the input code preprocessor 120 performs integer encoding on the divided input code (S125). Here, the integer encoding means drawing (or mapping) character strings (hereinafter, unit character strings) divided in predetermined units into specific integers. Through integer encoding, each unit string may be mapped to one integer. In this case, the integer mapped to the unit string may be arbitrarily determined.

However, the same integer may be mapped to the same unit string.

For example, referring to T43 in FIG. 11, the first unit character string 'Oxas' may be mapped to 3, the second unit character string 'dfda' may be mapped to 1, the third unit character string '01f' may be mapped to 2, and the fourth unit character string 0xfa may be mapped to 4. In this case, if the same unit string is included in the input codes divided for different wallet addresses (that is, the fourth unit string '0xfa' commonly included in the second wallet address and the third wallet address), the unit character string may be processed to be mapped to the same integer (That is, 4).

Next, the input code preprocessor 120 unifies the length of each encoded input code by performing a zero-padding operation in accordance with a preset maximum length of a character string on the encoded input code (S126).

Here, the zero-padding operation refers to an operation of adding '0', which means no information, to an end of a character string of which a length is relatively short to match the sizes of character strings of different lengths. For example, referring to T44 in FIG. 12, the input code of the first wallet address and the third wallet address may be configured of two integers, and the input code of the second wallet address may be configured of three integers. In this case, the input code preprocessor 120 may match the length of the character string of the encoded input code of the wallet address by adding 0 one by one after the input codes of the first wallet address and the third wallet address.

On the other hand, when the zero padding is performed according to the longest input code, data throughput may be unnecessarily increased. Accordingly, the input code preprocessor 120 unifies the length of the input code according to the preset maximum character string length. For example, in response to the length of the encoded input code is longer than the maximum character string length, values exceeding the maximum character string length may not be considered by deleting. In this case, the maximum character string length may be preset and used by an operator or a user.

Through steps S121 to S126 described above, the input code preprocessor 120 may generate a data set for the input code.

Hereinafter, like the input code preprocessor 120, a method of generating a data set for a bytecode in the bytecode preprocessor 130 will be described.

Figure 13:
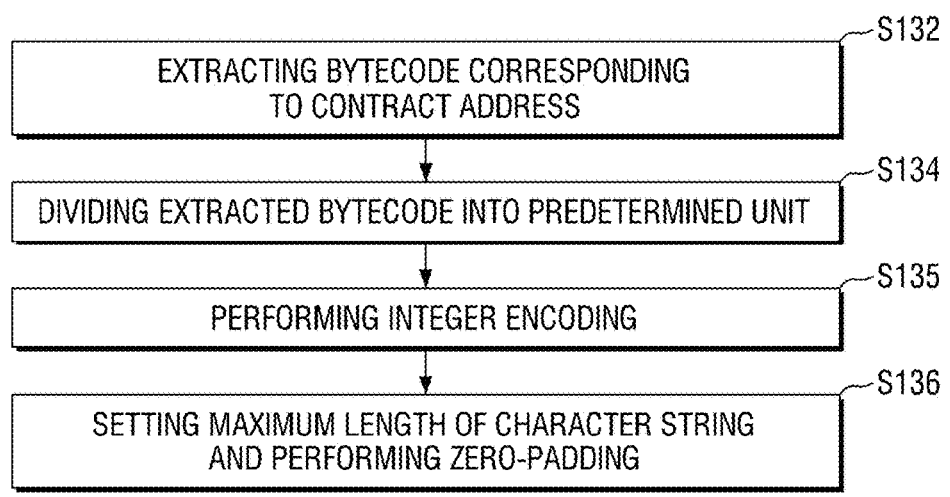
FIG. 13 is a flowchart illustrating an operation of a bytecode preprocessor of FIG. 2.

FIG. 13 is a flowchart illustrating an operation of the bytecode preprocessor of FIG. 2. Substantially, the operation of the bytecode preprocessor 130 is similar to the operation of the above-described input code preprocessor 120, and thus redundant descriptions will be omitted or simply described below.

Referring to FIG. 13, the bytecode preprocessor 130 extracts the bytecode corresponding to the contract address CA (S132). Here, the bytecode means a contract bytecode (hereinafter, bytecode) written in the contract address CA, and one bytecode is generated in one contract address CA.

More specifically, in response to a smart contract is programmed and a source code for the smart contract is compiled, the bytecode is generated, and the generated bytecode is included in a block and may be executed by an Ethereum Virtual Machine (EVM). Specific details of the bytecode have already been disclosed, so a detailed description thereof will be omitted.

Next, the bytecode preprocessor 130 divides the extracted bytecode into a predetermined unit (S134). Here, the predetermined unit n may be set to a natural number equal to or greater than 2, and the operation of step S134 may be performed substantially the same as step S124 described above with reference to FIG. 9.

Next, the bytecode preprocessor 130 performs integer encoding on the divided bytecode (S135). Here, the integer encoding means mapping character strings (hereinafter, unit character strings) divided into predetermined units to specific integers. Similarly, the operation of step S135 may be performed substantially the same as that of step S125 described above with reference to FIG. 9.

Next, the bytecode preprocessor 130 unifies the length of each encoded bytecode by performing the zero-padding operation according to the maximum length of a character string preset in the encoded bytecode (S136). Similarly, the operation of step S135 may be performed substantially the same as that of step S125 described above with reference to FIG. 9.

Through the above-described steps S132 to S136, the bytecode preprocessor 130 may generate a data set for the bytecode.

Next, referring again to FIG. 2, the oversampler 140 receives a statistical feature data set generated by the statistical feature preprocessor 110 (hereinafter, referred to as a statistical feature data set D1), a data set for the input code generated in the input code preprocessor 120 (hereinafter, referred to as an input code data set D2), and a data set for the bytecode generated by the bytecode preprocessor 130 (hereinafter, referred to as a bytecode data set D3).

Next, the oversampler 140 may expand the data amounts of the statistical feature data set D1, the input code data set D2, and the bytecode data set D3.

Specifically, the statistical feature data set D1, the input code data set D2, and the bytecode data set D3 may include a label value (that is, a value indicating whether the transaction is a fraudulent transaction or a normal transaction) for each data. However, since normal transaction cases are much more common than fraudulent transaction cases, it is necessary to increase the number of fraudulent transaction cases in order to learn an effective machine learning model. The oversampler 140 may increase the number of minority classes by performing an oversampling operation.

Hereinafter, an operation of the oversampler 140 will be described with reference to FIGS. 14 and 15 as an example.

Figure 14:
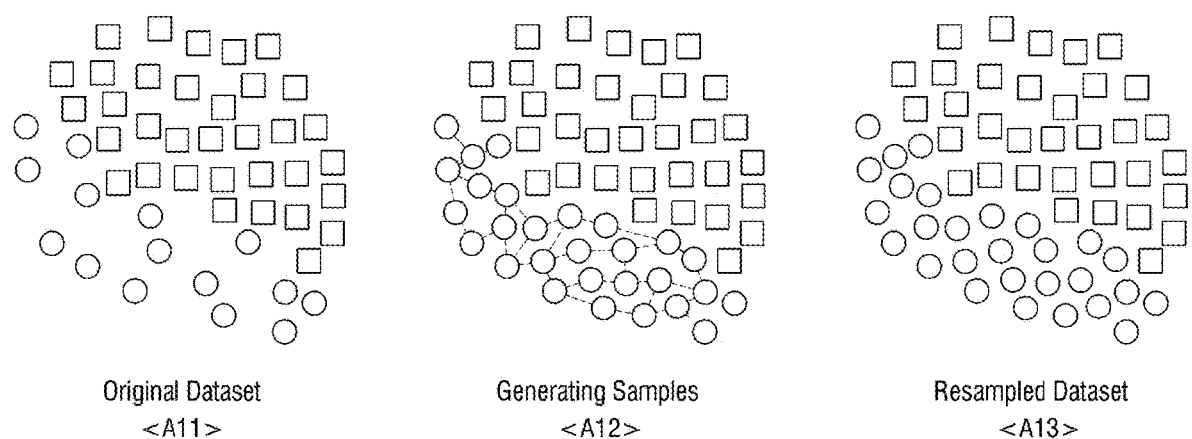
FIGS. 14 and 15 are diagrams for exemplarily explaining an operation of an oversampler of FIG. 2.
Figure 15:
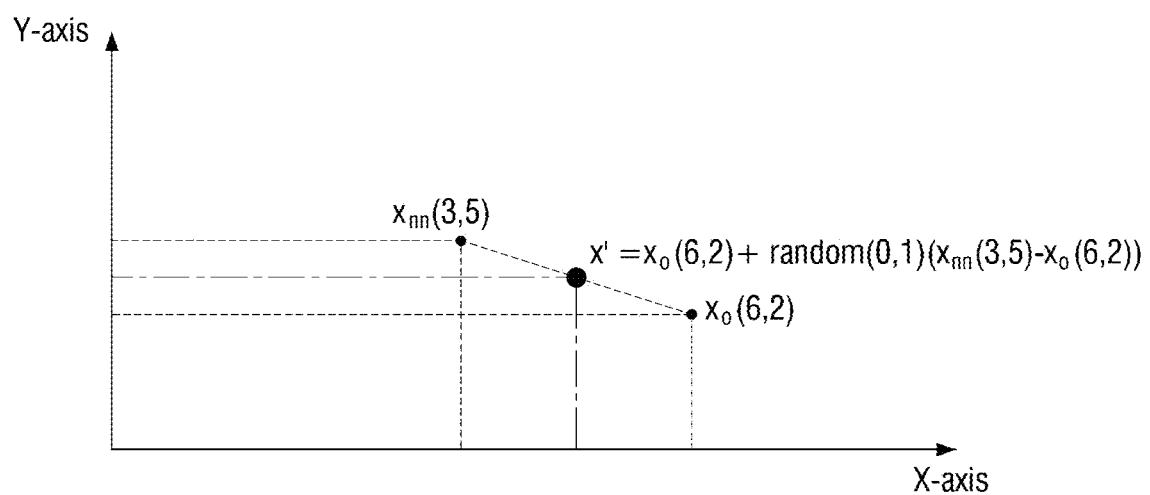

FIGS. 14 and 15 are diagrams for exemplarily explaining the operation of the oversampler of FIG. 2.

Referring to FIG. 14, in an original data set, a number of normal transaction cases (square icons) is more than a number of fraudulent transaction cases (circular icons). Accordingly, in generating samples, the oversampler 140 generates additional data based on data adjacent to each other by using Synthetic Minority Oversampling Technique (SMOTE) to increase the fraudulent transaction cases (circular icons). Through this, the oversampler 140 may generate a resampled data set in which the fraudulent transaction cases (circular icons) are increased.

Referring to FIG. 15, the SMOTE technique performed by the oversampler 140 generates additional data using the following [Equation 2] for two pieces of data adjacent to each other.

$$x'=x_0+\text{random}(0,1)*(x_0-x_{nn}) \quad \text{[Equation 2]}$$

Here, x' means newly generated additional data, and x0 and xnn mean two pieces of data adjacent to each other.

Through [Equation 2] above, the oversampler 140 may increase the amount of data included in the data set by generating new additional data located in the middle of two adjacent pieces of data. Through this, the oversampler 140 may equalize the number of minority class data having a relatively little weight and the number of majority class data having a relatively large weight.

However, in the present disclosure, the method used by the oversampler 140 to increase data is not limited to the above method, and it goes without saying that various methods for increasing data may be used.

The performance of the learning model was tested by dividing a case in which oversampling is performed and a case in which oversampling is not performed, and the results are illustrated in [Table 2] below.

TABLE 2

| Case | Accuracy(%) | Precision | Recall | F1 Score |
|---|---|---|---|---|
| Case in which oversampling is performed | 91.1 | 0.703 | 0.853 | 0.762 |
| Case in which oversampling is not performed | 90.8 | 0.854 | 0.574 | 0.689 |

Here, the accuracy means a matching rate between a label value in the data set and a predicted value of the fraud detection model (hereinafter, the detection model) of the present disclosure, and the precision means a ratio of an actually labeled case as fraudulent transaction to all cases in all cases which are determined by the detection model to be fraudulent transaction. The recall means a ratio of a case which is predicted as transaction is fraudulent by the detection model to actually all cases labeled as fraudulent transaction, and the F1 Score means a value of a harmonic mean between recall and precision.

In this case, the F1 score may determine the performance of the detection model by using the harmonic mean to measure the absolute magnitude of recall and precision, and how different the recall and precision are.

Therefore, referring to the results of [Table 2] above, it may be confirmed that the detection performance of the detection model for the fraudulent transactions is improved in response to oversampling is performed.

Referring again to FIG. 2, the oversampler 140 may output a first data set D1' by oversampling the statistical feature data set D1, output a second data set D2' by oversampling the input code data set D2, and output a third data set D3' by oversampling the bytecode data set D3.

As a result, the data preprocessor 100 may generate and output the first data set D1' based on the statistical features generated by using the transaction data for a specific user's wallet address, generate and output the second data set D2' based on the input code included in the transaction data, and generate and output the third data set D3' based on the bytecode included in the smart contract used by the user.

Next, the first to third data sets D1', D2', and D3' output from the data preprocessor 100 are input to the feature vector extractor 200.

The feature vector extractor 200 includes a first feature vector extractor 210, a second feature vector extractor 220, and a third feature vector extractor 230.

Hereinafter, each configuration and operation method of the first feature vector extractor 210, the second feature vector extractor 220, and the third feature vector extractor 230 will be described in detail with reference to FIGS. 16 to 20.

Figure 16:
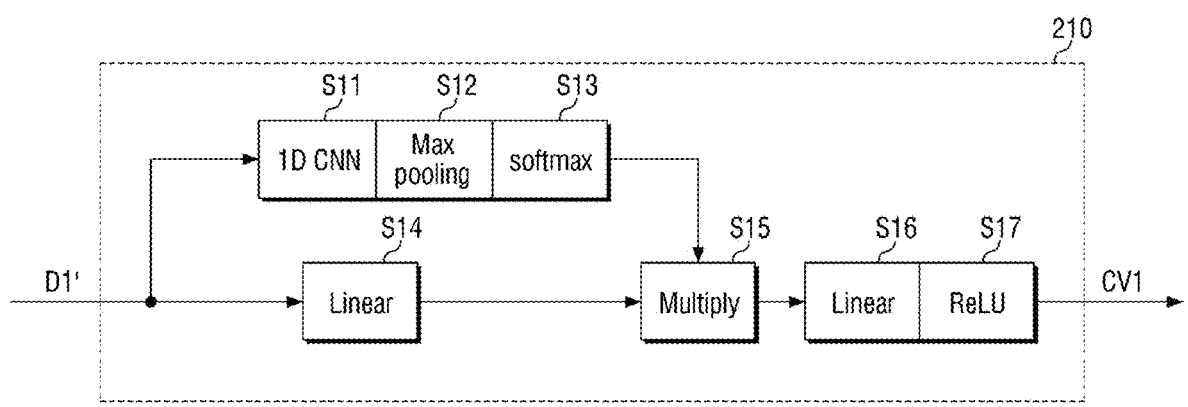
FIG. 16 is a block diagram illustrating a configuration of a first feature vector extractor of FIG. 2.
Figure 17:
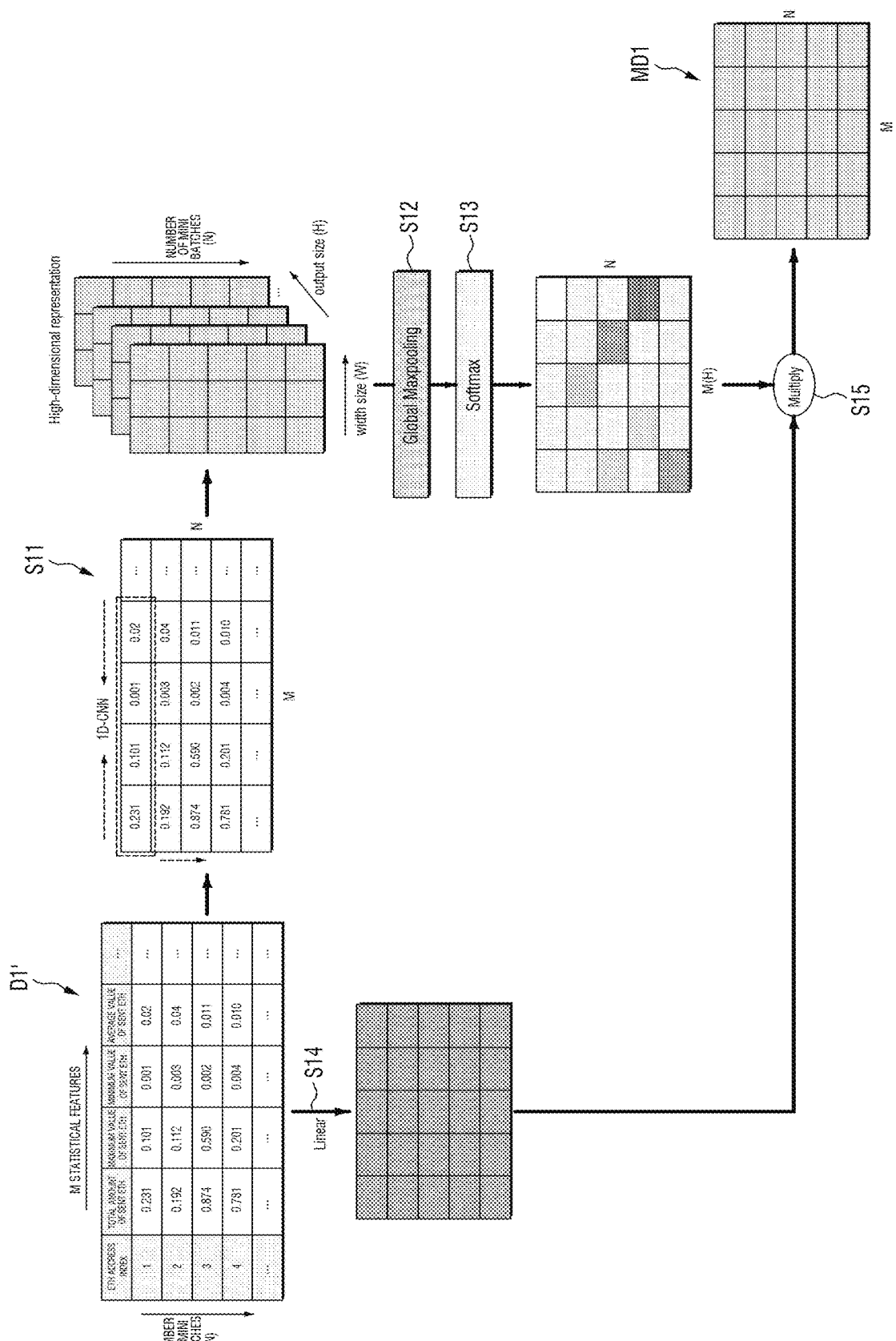
FIG. 17 is a diagram for exemplarily explaining an operation of the first feature vector extractor of FIG. 2.

FIG. 16 is a block diagram illustrating a configuration of the first feature vector extractor of FIG. 2. FIG. 17 is a diagram for exemplarily explaining an operation of the first feature vector extractor of FIG. 2.

Referring to FIGS. 16 and 17, the first feature vector extractor 210 receives the first data set D1' (that is, a data set generated based on statistical features generated by using the transaction data) and outputs the first feature vector CV1 as an output thereof.

The first feature vector extractor 210 extracts a new feature for the first data set D1' using a 1-dimensional convolutional neural network (hereinafter, 1D-CNN) (S11). However, the convolutional neural network used in the present disclosure is not limited to the 1D-CNN, and a multidimensional CNN module may be used. However, for convenience of description, in the present specification, the 1D-CNN will be described as an example.

Specifically, the 1D-CNN may be used for the purpose of capturing spatial information on the statistical features and a spatial correlation between each element.

Statistical feature values in the same row of the first data set D1' are correlated with each other. For example, the total amount, the maximum value, the minimum value, the average value, and the standard deviation, and the like of ETH sent from one wallet address may be values that are related to each other. In response to using the convolutional neural network, if the kernel size is 4, the 1D-CNN model may obtain a new feature value by considering the four features of total amount, maximum value, minimum value, and average value.

That is, in response to the 1D-CNN is applied by the first feature vector extractor 210, new features for statistical feature values in one row may be extracted as much as a set kernel size.

Next, the first feature vector extractor 210 may reduce a dimension of a hidden state vector by applying global maxpooling (or maxpooling) to a value passed through the 1D-CNN (S12). At this time, since the global maxpooling derives the maximum value within the pooling size, the size of the vector (for example, width size) may be reduced, and elements of relatively low importance among statistical feature values are not considered. Therefore, efficient learning is possible in terms of computational complexity. Since the contents of the global maxpooling are already known, a detailed description will be omitted here.

Next, the first feature vector extractor 210 applies a softmax function to the value that has passed the global maxpooling (S13). Here, the softmax function changes all input values to a probability form, and compresses each input value within a range of 0 to 1 so that the sum becomes 1 in response to all output values of the softmax function are added. That is, the first feature vector extractor 210 may quantify how much influence each feature value has on detecting whether there is a fraudulent transaction by applying the softmax function.

Here, the soft function σ(x)i may be calculated by the following [Equation 3].

$$\sigma(x)_i = \frac{e^{x_i}}{\sum_{j=1}^{K} e^{x_j}}$$ [Equation 3]

Here, K means the number of elements.

The softmax function is different from the known sigmoid function in that it is an activation function that may calculate the relative importance of a specific element with respect to other components.

Steps S11 to S13 described above may be interpreted as a process of applying the importance weight gate to the first data set D1' including statistical features.

On the other hand, the first feature vector extractor 210 applies a linear artificial neural network (hereinafter, ANN) to the first data set D1' (S14).

Next, the first feature vector extractor 210 calculates an element-wise product of the result value of step S13 and the result value of step S14 (S15). In this case, the element-wise product multiplies the initial statistical feature value and the numerical value of how much each statistical feature is weighted, so that a high weight may be given to a statistical value that plays an important role in detecting the fraudulent transaction.

Next, the first feature vector extractor 210 sequentially applies a linear artificial neural network (for example, ANN; hereinafter, Linear) and a rectified linear unit (hereinafter, ReLU) function to the result value of step S15, thereby outputting the first feature vector CV1 (S16 and S17).

At this time, the performance of the learning model was tested by dividing into a case in which the importance weight gate is applied in the first feature vector extractor 210 (that is, steps S11 to S15 are applied) and a case in which the importance weight gate is not applied therein (that is, steps S11 to S13 are omitted and only step S14 is performed), and the results are illustrated in [Table 3] below. Since the descriptions of the accuracy, precision, recall, and F1 score in [Table 3] have been described above, redundant descriptions will be omitted below.

TABLE 3

| Case | Accuracy(%) | Precision | Recall | F1 Score |
|---|---|---|---|---|
| Case in which importance weight gate is applied | 91.1 | 0.703 | 0.853 | 0.762 |
| Case in which importance weight gate is not applied | 84.2 | 0.528 | 0.934 | 0.674 |

Therefore, referring to the results of [Table 3] above, it may be confirmed that the detection performance of the detection model for the fraudulent transaction is improved in a case in which the importance weight gate is applied (that is, in a case in which steps S11 to S15 are applied).

Figure 18:
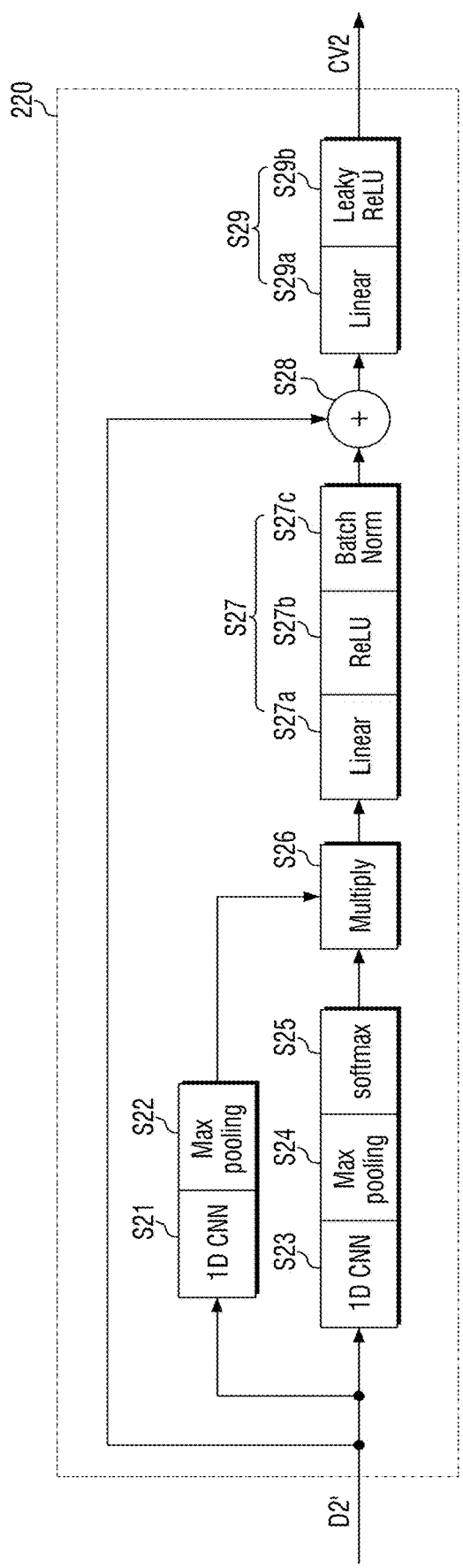
FIG. 18 is a block diagram illustrating a configuration of a second feature vector extractor of FIG. 2.
Figure 19:
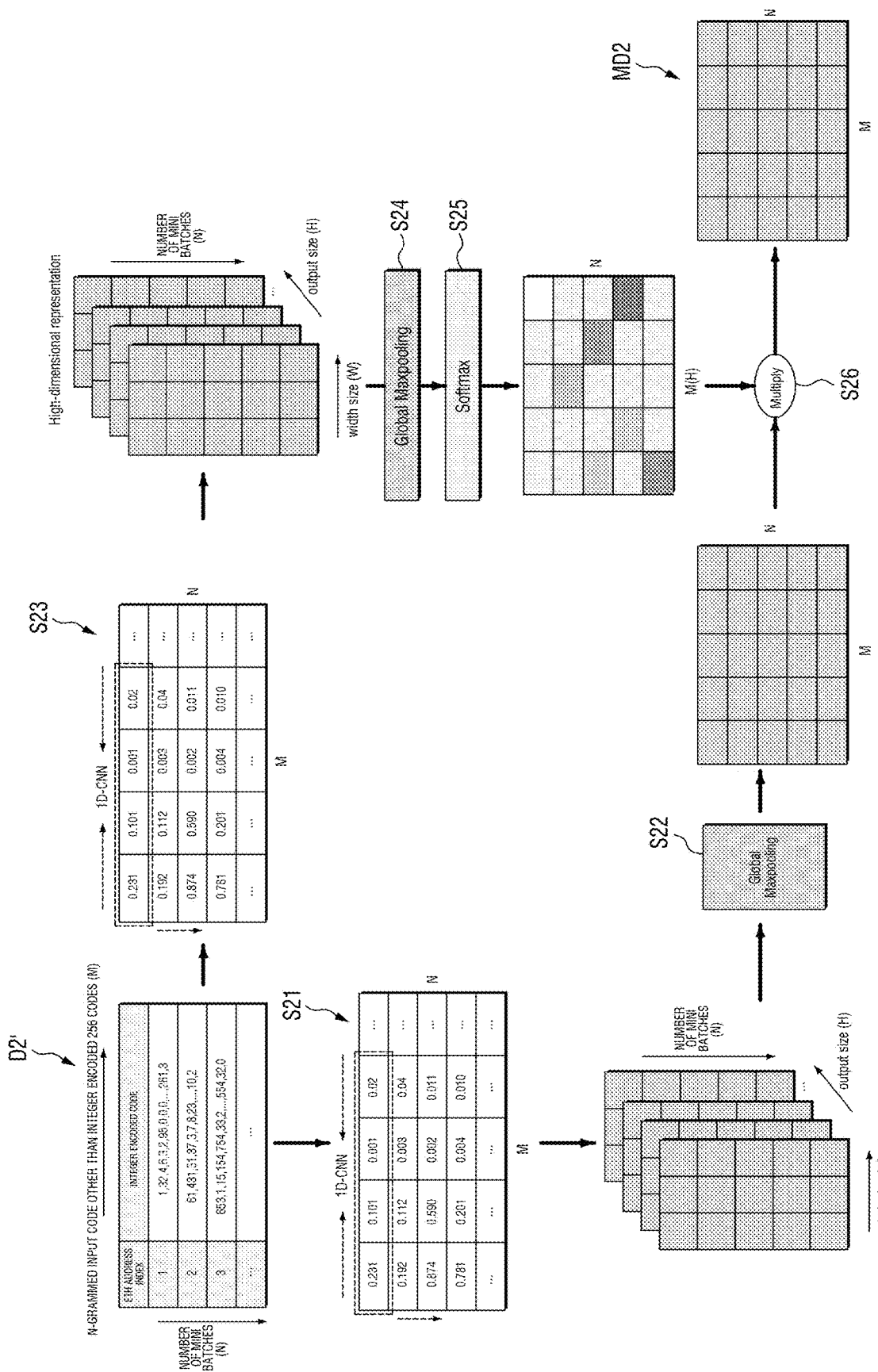
FIG. 19 is a diagram for exemplarily explaining an operation of the second feature vector extractor of FIG. 2.

FIG. 18 is a block diagram illustrating a configuration of the second feature vector extractor of FIG. 2. FIG. 19 is a diagram for exemplarily explaining an operation of the second feature vector extractor of FIG. 2. Hereinafter, redundant contents with the contents described in the above-described first feature vector extractor 210 will be omitted or simplified, and differences will be mainly described.

Referring to FIGS. 18 and 19, the second feature vector extractor 220 receives the second data set D2' (that is, the data set generated based on the input code extracted from transaction data), and outputs the second feature vector CV2 as an output thereof.

First, the second feature vector extractor 220 derives a first intermediate value sequentially passed through a 1-dimensional convolutional neural network (hereinafter, 1D-CNN) and global maxpooling (S21 and S22).

In addition, the second feature vector extractor 220 derives a second intermediate value sequentially passed through the 1-dimensional convolutional neural network (hereinafter, 1D-CNN), the global maxpooling, and the softmax function (S23, S24, and S25).

Next, the second feature vector extractor 220 calculates an element-wise product of the first intermediate value and the second intermediate value (S26).

Next, the second feature vector extractor 220 sequentially applies a linear artificial neural network (S27a), a ReLU function (S27b), and a batch normalization (S27c) (S27). Here, batch normalization refers to an artificial neural network technique that prevents input values from being biased, too spread out, or too narrow by inserting a batch normalization layer into the neural network, and re-adjusting the mean and standard deviation of the input values of each layer for a batch that collects several input values. Since a method of performing the batch normalization is already known, a detailed description thereof will be omitted herein.

Next, the second feature vector extractor 220 adds the second data set D2' to the result value of step S27 (S28).

Next, the second feature vector extractor 220 outputs a second feature vector CV2 by sequentially applying a linear artificial neural network (S28a) and a leaky ReLU (S28b) function (S28). Here, since the Leaky ReLU function is already known, a detailed description thereof will be omitted.

At this time, the performance of the learning model was tested by dividing into a case in which the importance weight gate including the CNN is applied in the second feature vector extractor 220 and a case in which the RNN series model (for example, LSTM or GRU) is applied therein, and the results are illustrated in [Table 4] below. Since the descriptions of the accuracy, precision, recall, and F1 score in [Table 4] have been described above, redundant descriptions will be omitted below.

TABLE 4

| Case | Accuracy (%) | Precision | Recall | F1 Score |
|---|---|---|---|---|
| Case in which importance weight gate including CNN is applied | 91.1 | 0.703 | 0.853 | 0.762 |
| GRU | 88.5 | 0.618 | 0.902 | 0.741 |
| LSTM | 89.9 | 0.667 | 0.853 | 0.742 |

Therefore, referring to the results of [Table 4] above, it may be confirmed that the detection performance of the detection model for the fraudulent transaction is improved in a case in which the importance weight gate is applied compared to a case in which only the RNN series model is used. In addition, the CNN included in the importance weight gate has an advantage of lowering the computational complexity and improving the speed of model learning compared to a case in which the RNN is used.

Figure 20:
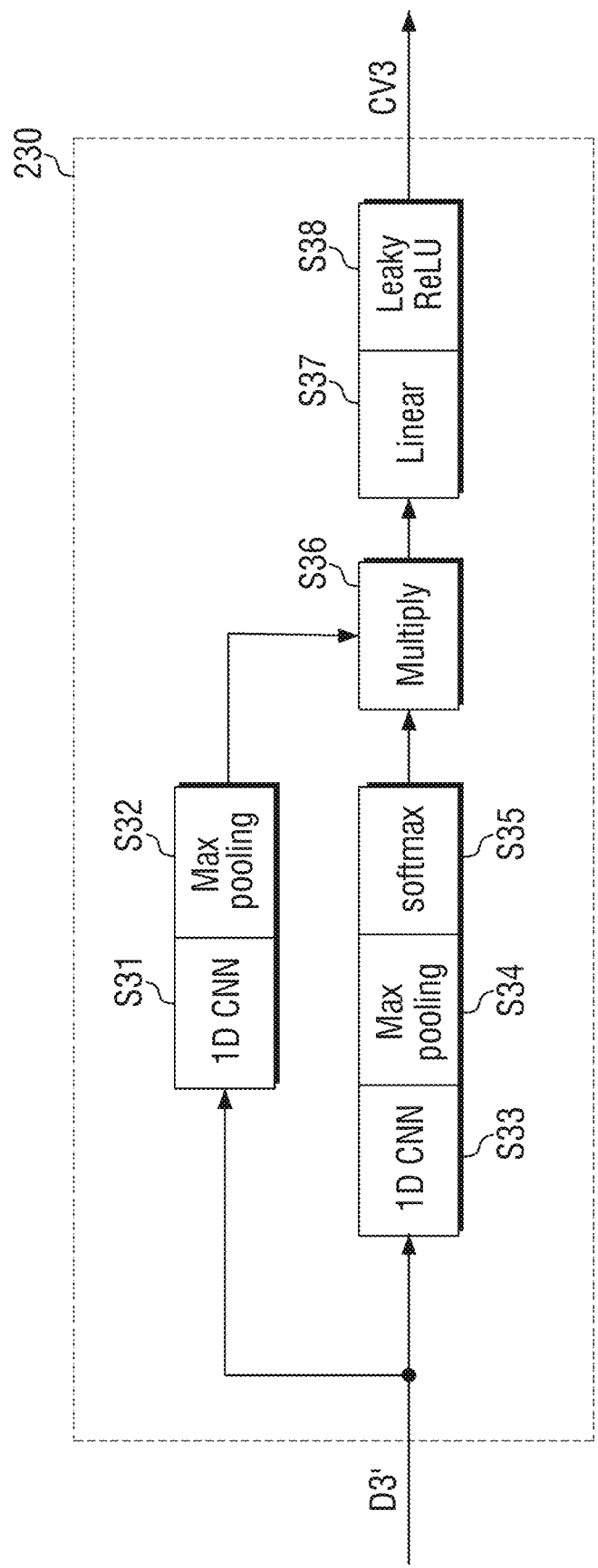
FIG. 20 is a block diagram illustrating a configuration of a third feature vector extractor of FIG. 2.

FIG. 20 is a block diagram illustrating a configuration of the third feature vector extractor of FIG. 2. Hereinafter, redundant content with those described in the above-described first feature vector extractor 210 and second feature vector extractor 220 will be omitted or simplified, and differences will be mainly described.

Referring to FIG. 20, the third feature vector extractor 230 receives the third data set D3' (that is, a data set generated based on the bytecode written in the contract address CA), and outputs the third feature vector CV3 as an output thereof.

First, the third feature vector extractor 230 derives a first intermediate value sequentially passed through the 1-dimensional convolutional neural network (hereinafter, 1D-CNN) and global maxpooling (S31 and S32).

In addition, the third feature vector extractor 230 derives a second intermediate value sequentially passed through is the 1-dimensional convolutional neural network (hereinafter, 1D-CNN), the global maxpooling, and the softmax function (S33, S34, and S35).

Next, the third feature vector extractor 230 calculates an element-wise product of the first intermediate value and the second intermediate value (S36).

Next, the third feature vector extractor 230 sequentially applies a linear artificial neural network (S37) and a leaky ReLU (S38) function to output the third feature vector CV3 (S37 and S38).

In this case, the third feature vector extractor 230 uses more layers than those of the second feature vector extractor 220. In response to the same model is experimentally used, the model using the bytecode has lower detection performance than the model using the input code. Therefore, in the present disclosure, in order to compensate for this, the third feature vector extractor 230 is designed to use more layers than those of the second feature vector extractor 220.

In this case, the batch normalization used in the second feature vector extractor 220 solves a problem of a covariate shift phenomenon appearing whenever the learning flow passes through an activation function (ex. ReLU, or the like) during model learning. That is, batch normalization performs a function of stabilizing the learning process. [Table 5] illustrates the results of comparing the performance of the second feature vector extractor 220 and the third feature vector extractor 230. Since the descriptions of the accuracy, precision, recall, and F1 score in [Table 5] have been described above, redundant descriptions will be omitted below.

TABLE 5

| Case | Accuracy (%) | Precision | Recall | F1 Score |
|---|---|---|---|---|
| Model using bytecode | 87.9 | 0.602 | 0.918 | 0.726 |
| Model using input code | 91.1 | 0.703 | 0.853 | 0.762 |

Next, referring again to FIG. 2, the first feature vector CV1 output from the first feature vector extractor 210, the second feature vector CV2 output from the second feature vector extractor 220, and the third feature vector CV3 output from the third feature vector extractor 230 are transmitted to the feature vector inferencer 300.

Hereinafter, a configuration and an operation of the feature vector inferencer 300 will be described with reference to FIG. 21.

Figure 21:
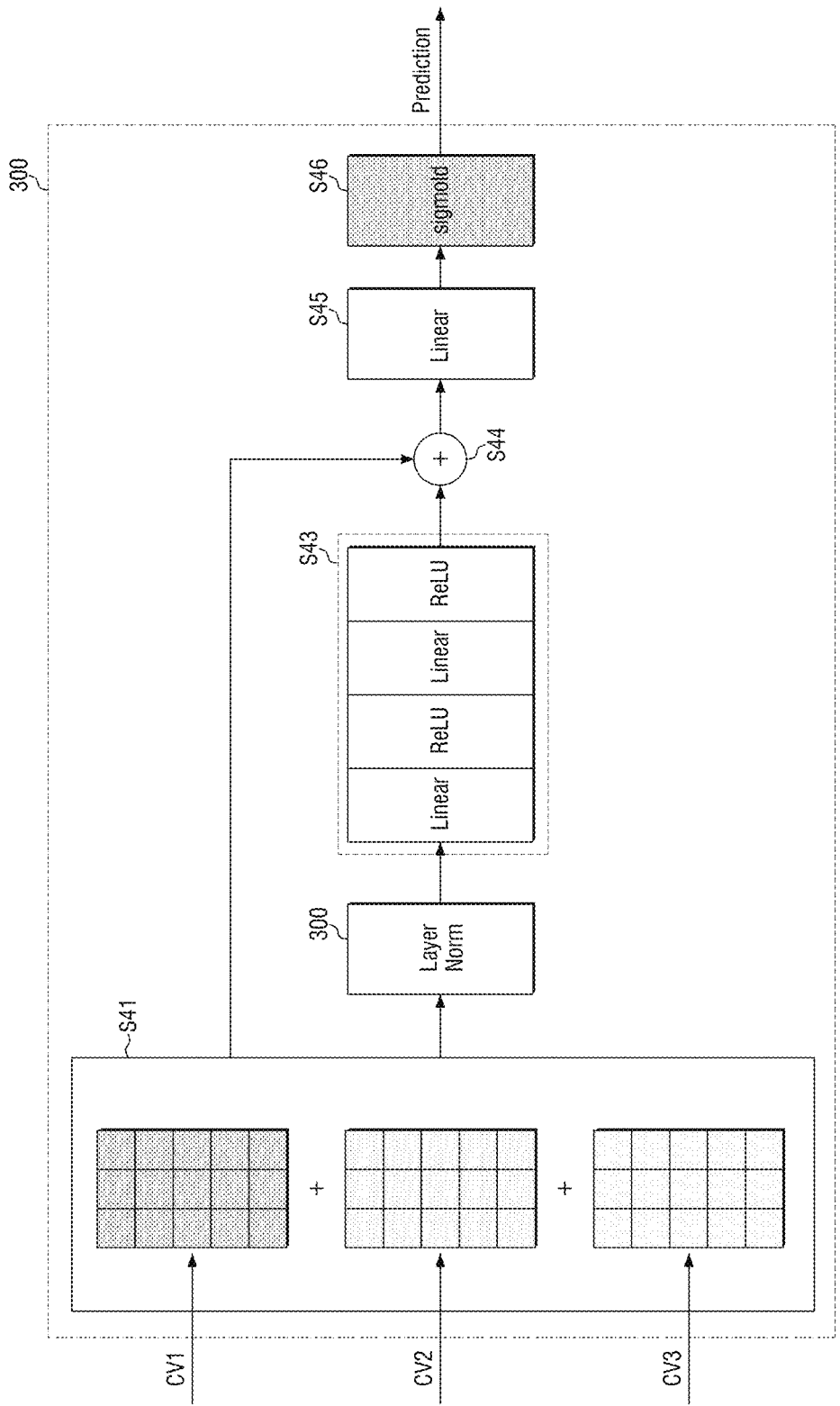
FIG. 21 is a block diagram illustrating a configuration of a feature vector inferencer of FIG. 2.

FIG. 21 is a block diagram illustrating the configuration of the feature vector inferencer of FIG. 2.

Referring to FIG. 21, the feature vector inferencer 300 concatenates the first to third feature vectors CV1, CV2, and CV3, and uses the layer normalization, the feed-forward network, and the sigmoid function to output a prediction on whether there is a fraudulent transaction.

First, the feature vector inferencer 300 concatenates the first to third feature vectors CV1, CV2, and CV3 (S41). Here, concatenation means connecting two or more feature vectors to each other.

The feature vector inferencer 300 may concatenate a plurality of flows in a manner of combining different information flows of statistical features, input codes, and bytecodes. In response to the detection model detects whether there is a fraudulent transaction by concatenating the first to third feature vectors CV1, CV2, and CV3, the feature vector inferencer 300 makes it possible to consider all of the previously preprocessed statistical features, input codes, and bytecodes.

Next, the feature vector inferencer 300 performs the layer normalization on the concatenated feature vectors (S42). The layer normalization used in this process helps to stabilize learning. In this case, since the method of layer normalization is already known, a detailed description thereof will be omitted.

Next, the feature vector inferencer 300 forms a feed-forward network structure by alternately applying the linear artificial neural network (Linear) and the leaky ReLU function, and passes the layer normalized data (S43). The feed-forward network structure helps to increase the level of abstraction in response to learning the detection model while allowing a deeper model to be built.

Next, the feature vector inferencer 300 adds the first output value of step S41 and the second output value of step S43 (S44).

Next, the feature vector inferencer 300 sequentially passes the linear artificial neural network and the sigmoid function for the value added in step S44 to output a prediction of whether there is a fraudulent transaction (S45 and S46). Here, the sigmoid function σ(x) is an activation function calculated by the following [Equation 4].

$$\sigma(x) = \frac{1}{1 + e^{-x}} \qquad \text{[Equation 4]}$$

The sigmoid function corresponds to a binary classification model that classifies one of the fraudulent transaction or the normal transaction for detection on whether there is a fraudulent transaction. Therefore, the sigmoid function may determine that if the output value of step S45 is greater than a predetermined reference value (for example, 0.5), it is considered the fraudulent transaction, and if it is smaller than the predetermined reference value (for example, 0.5), it is considered the normal transaction.

Steps S42 to S45 in the feature vector inferencer 300 correspond to the encoder structure of the transformer, and the results of testing the performance of the learning model by dividing a case in which the structure is applied and a case in which the structure is not applied are as [Table 6] below. Since the descriptions of the accuracy, precision, recall, and F1 score in [Table 6] have been described above, redundant descriptions will be omitted below.

TABLE 6

| Case | Accuracy (%) | Precision | Recall | F1 Score |
| --- | --- | --- | --- | --- |
| Case in which encoder structure of transformer is applied | 91.1 | 0.703 | 0.853 | 0.762 |
| Case in which encoder structure of transformer is not applied | 90.8 | 0.699 | 0.837 | 0.760 |

Therefore, referring to the results of [Table 6] above, it may be confirmed that the detection performance for the fraudulent transactions is improved in a case in which the encoder structure of the transformer is applied.

Figure 22:
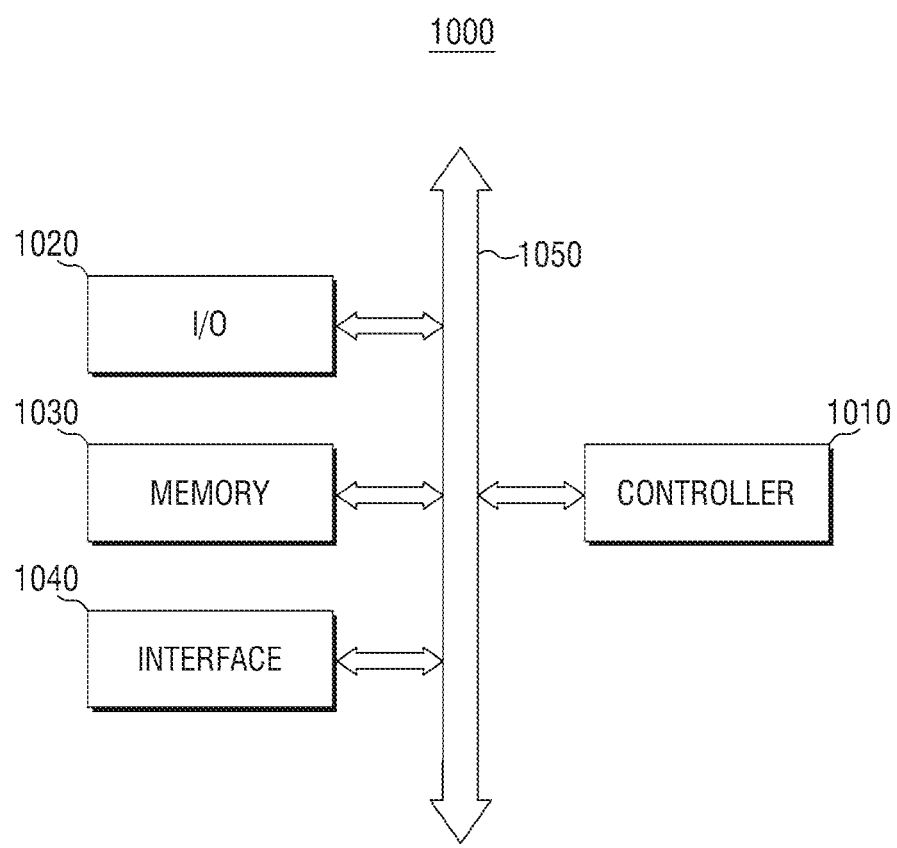
FIG. 22 is a diagram for explaining a hardware implementation of a system for performing a fraud detection method according to some embodiments of the present disclosure.

FIG. 22 is a diagram for explaining a hardware implementation of a system for performing a fraud detection method according to some embodiments of the present disclosure.

Referring to FIG. 22, the server 100 performing the fraud detection method according to some embodiments of the present disclosure may be implemented as an electronic device 1000. The electronic device 1000 may include a controller 1010, an input/output device (I/O) 1020, a memory device 1030, an interface 1040, and a bus 1050.

The controller 1010, the input/output device 1020, the memory device 1030, and/or the interface 1040 may be coupled to each other via the bus 1050. In this case, the bus 1050 corresponds to a path through which data is moved.

Specifically, the controller 1010 may include at least one of a central processing unit (CPU), a micro processor unit (MPU), a micro controller unit (MCU), a graphic processing unit (GPU), a microprocessor, a digital signal processor, a microcontroller, an application processor (AP), or logic devices capable of performing functions similar thereto.

The input/output device 1020 may include at least one of a keypad, a keyboard, a touch screen, or a display device.

The memory device 1030 may store data and/or a program.

The interface 1040 may perform a function of transmitting data to a communication network or receiving data from the communication network. The interface 1040 may be in a wired or wireless form. For example, the interface 1040 may include an antenna or a wired/wireless transceiver. Although not illustrated, the memory device 1030 is a working memory for improving the operation of the controller 1010, and may further include a high-speed DRAM and/or SRAM. The memory device 1030 may store a program or an application therein.

Each of the server 100 and the user terminal 1100 according to embodiments of the present disclosure may be a system in which a plurality of electronic devices 1000 are connected to each other via a network to be formed. In this case, each module or combinations of modules may be implemented as the electronic device 1000. However, the present embodiment is not limited thereto.

Additionally, the server 100 may be implemented as at least one of a workstation, a data center, an internet data center (IDC), a direct attached storage (DAS) system, a storage area network (SAN) system, a network attached storage (NAS) system, a redundant array of inexpensive disks, or redundant array of independent disks (RAID) system, or an electronic document management system (EDMS), but the present embodiment is not limited thereto.

In addition, the server 100 may transmit data via a network using the user terminal 1100. The network may include a network based on a wired Internet technology, a wireless Internet technology, and a short-range communication technology. The wired Internet technology may include, for example, at least one of a local area network (LAN) or a wide area network (WAN).

The wireless Internet technologies include, for example, at least one of wireless LAN (WLAN), digital living network alliance (DMNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), or 5G new radio (NR) technology. However, the present embodiment is not limited thereto.

The short-range communication technology may include, for example, at least one of Bluetooth, radio frequency identification (RFID), infrared data association (IrDA), ultra-wideband (UWB), ZigBee, near field communication (NFC), ultra sound communication (USC), visible light communication (VLC), Wi-Fi, Wi-Fi Direct, or 5G new radio (NR). However, the present embodiment is not limited thereto.

The server 100 communicating via the network may comply with a technical standard and a standard communication method for mobile communication. For example, the standard communication method may include at least one of global system for mobile communication (GSM), code division multi access (CDMA), code division multi access 2000 (CDMA2000), Enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), or 5G new radio (NR). However, the present embodiment is not limited thereto.

Although the embodiments of the present disclosure have been described above with reference to the accompanying drawings, those of ordinary skill in the art to which the present disclosure pertains will be able to understand that the present disclosure may be embodied in other specific forms without changing the technical spirit or essential features. Therefore, it should be understood that the embodiments described above are illustrative in all respects and not restrictive.

What is claimed is:

1. A deep learning based method for detecting abnormal cryptocurrency transactions between computing devices in a blockchain network, the method comprising:
  establishing, by a communication interface of a fraud detection server, a communication link with a plurality of computing devices in the blockchain network,
    the plurality of computing devices comprising a first computing device associated with a first user wallet address and one or more second computing devices associated with one or more second user wallet addresses,
    the fraud detection server comprising a memory configured to store:
      one or more transaction data of transactions between the first user wallet address and at least one of the one or more second user wallet addresses,
      one or more input codes associated with the transactions between the first user wallet address and the at least one of the one or more second user wallet addresses, and one or more bytecodes associated with distributing the one or more input codes in the blockchain network;

generating, by a processor of the fraud detection server, a first data set associated with the first user wallet address based at least in part on the one or more transaction data, the first data set comprising a set of normalized statistical features of the one or more transaction data, by:
retrieving, from the memory of the fraud detection server, a set of transaction data of the one or more transaction data associated with the first user wallet address,
deriving a set of statistical features based on the set of transaction data, and
converting the set of statistical features into the set of normalized statistical features, the set of normalized statistical features comprising a label value indicating a fraudulent cryptocurrency transaction or a normal cryptocurrency transaction in the blockchain network;

converting, by the processor, the one or more input codes into a second data set associated with the first user wallet address, the second data set comprising a first set of integers, by:
retrieving, from the memory, a set of transaction data of the one or more transaction data associated with the first user wallet address,
extracting a set of input codes of the one or more input codes included in the set of transaction data,
concatenating the set of input codes into a string,
dividing the string by a predetermined unit to generate a divided string,
performing integer encoding on the divided string, and
inserting the result of integer encoding into the first set of integers, the first set of integers comprising a label value indicating a fraudulent cryptocurrency transaction or a normal cryptocurrency transaction in the blockchain network;

converting, by the processor, the bytecodes into a third data set associated with a contract address of the first user wallet address, the third data set comprising a second set of integers, by:
extracting a set of bytecodes of the one or more bytecodes associated with the contract address,
dividing the set of bytecodes by a predetermined unit,
performing integer encoding on the divided set of bytecodes, and
inserting the result of integer encoding into the second set of integers, the second set of integers comprising a label value indicating a fraudulent cryptocurrency transaction or a normal cryptocurrency transaction in the blockchain network;

running a pre-learned deep learning module of the processor using the first data set associated with the set of normalized statistical features to extract a first feature vector, the first feature vector comprising a first new feature generated by correlating adjacent statistical features in the first data set;

running the pre-learned deep learning module of the processor using the second data set associated with the one or more input codes to extract a second feature vector, the second feature vector comprising a second new feature data generated by correlating adjacent input codes in the second data set;

running the pre-learned deep learning module of the processor using the third data set associated with the one or more bytecodes to extract a third feature vector, the third feature vector comprising a third new feature data generated by correlating adjacent bytecodes in the third data set, wherein a first number of layers are used in the pre-learned deep learning module that extracts the third feature vector by using the one or more bytecodes, wherein a second number of layers are used in the pre-learned deep learning module that extracts the second feature vector by using the one or more input codes, wherein the first number of layers are greater than the second number of layers in order to compensate a detection performance that would be lower in the pre-learned deep learning module that uses the one or more bytecodes than in the pre-learned deep learning module that uses the one or more input codes, and wherein the detection performance comprises:
an accuracy performance representing a matching rate between a label value of the second or third data set and a predicted value of the pre-learned deep learning module for fraudulent cryptocurrency transaction detection, and
a precision performance representing a ratio of a case as actually labeled fraudulent cryptocurrency transaction to all cases determined by the pre-learned deep learning module to be fraudulent cryptocurrency transaction;

combining, by the processor, the first feature vector, the second feature vector, and the third feature vector into an intermediate value, by:
concatenating the first feature vector, the second feature vector, and the third feature vector into a concatenated vector;
performing layer normalization on the concatenated vector,
applying a layer normalized value to a feed-forward network, and
deriving the intermediate value obtained by adding a value that has passed through the feed-forward network to the concatenated vector; and running the pre-learned deep learning module of the processor using the intermediate value to determine the fraudulent cryptocurrency transaction in the blockchain network by:
comparing, by the processor, the intermediate value to a predetermined reference value stored in the memory; and
determining, by the processor, a fraudulent activity in the transaction between the first wallet address and the at least one of the one or more second user wallet addresses in response to the intermediate value being greater than the predetermined reference value, by using a binary classification model that classifies the transaction as one of a fraudulent cryptocurrency transaction or a normal cryptocurrency transaction based on a comparison of the intermediate value and the predetermined reference value, wherein running the pre-learned deep learning module to extract the first feature vector comprises applying an importance weight gate to the first data set associated with the set of normalized statistical features by:
applying, by the processor, a linear artificial neural network (ANN) to the first data set to generate a first result value, the first result value representing an initial statistical feature, applying, by the processor, the first data set to a pre-learned convolutional neural network (CNN), applying, by the processor, maxpooling to a value that has passed through the convolutional neural network to reduce a dimension of a hidden state vector and not to consider elements of relatively low importance among statistical feature values, applying, by the processor, a softmax function to a value that has passed through the maxpooling to generate a second result value, the second result value representing a numerical value of how much each statistical feature among the set of normalized statistical features is weighted on detecting whether there is a fraudulent cryptocurrency transaction, and multiplying, by the processor, the first result value and the second result value to generate an element-wise product, wherein the element-wise product enables a higher weight to be given to a statistical value that plays a more important role in detecting the fraudulent cryptocurrency transaction, wherein the feed-forward network comprises two or more linear artificial neural networks and two or more leaky ReLU functions alternately arranged with respect to each other, and wherein applying the layer normalized value to the feed-forward network comprises:
feeding the layer normalized value into a first linear artificial neural network of the two or more linear artificial neural networks;
feeding an output of the first linear artificial neural network into a first leaky ReLU function of the two or more leaky ReLU functions;
feeding an output of the first leaky ReLU function into a second linear artificial neural network of the two or more linear artificial neural networks; and
feeding an output of the second linear artificial neural network into a second leaky ReLU function of the two or more leaky ReLU functions.

2. The deep learning based method of claim 1, further comprising:
extracting, by the processor, the input codes from the transaction data and storing the input codes in the memory; and
extracting, by the processor, the bytecodes from the transaction data and storing the bytecodes in the memory.

3. The deep learning based method of claim 1, wherein the pre-learned module is configured to perform operations on the first data set, the second data set, and the third data set, based on at least one example fraud transaction.

4. The deep learning based method of claim 1, further comprising:
performing, by the processor, oversampling to increase a number of data for at least one of the first data set, the second data set, or the third data sets, wherein performing the oversampling includes:
selecting a plurality of data included in at least one of the first data set, the second data set, or the third data set, and
generating additional data by using synthetic minority oversampling technique (SMOTE) for the plurality of selected data.

5. The deep learning based method of claim 4, wherein the oversampling is performed on the second data set and the third data set.

6. The deep learning based method of claim 1, wherein generating the first data set comprises:
retrieving, from the memory, the transaction data;
deriving, by the processor, the set of statistical features based on the transaction data; and
converting, by the processor, the set of statistical features into the set of normalized statistical features, the set of normalized statistical features comprising features distributed between 0 and 1.

7. The deep learning based method of claim 6, wherein the set of statistical features comprises:
a first statistical feature generated based on the one or more transaction data of a retrieval transaction between the first user wallet address and the at least one of the one or more second user wallet addresses, and
a second statistical feature generated based on the one or more transaction data of a transmission transaction between the first user wallet address and the at least one of the one or more second user wallet addresses.

8. The deep learning based method of claim 7, wherein generating the first data set further comprises replacing a missing value with a predetermined placeholder value in response to a lack of the retrieval transaction or the transmission transaction, and thereby the missing value is generated in the first statistical feature or the second statistical feature.

9. The deep learning based method of claim 1, wherein converting the input codes into the second data set comprises:
receiving, from the memory, a plurality of transaction data associated with the first user wallet address,
extracting, by the processor, a plurality of input codes comprised in the plurality of transaction data,
concatenating, by the processor, the plurality of input codes into a string,
dividing, by the processor, the string by a predetermined unit to generate a divided string,
performing, by the processor, integer encoding on the divided string, and
inserting, by the processor, the result of integer encoding into the first set of integers.

10. The deep learning based method of claim 9, wherein converting the input codes into the second data set further comprises:
adding, by the processor, a predetermined character to the string in response to a length of the string being shorter than a predetermined maximum character string length, and
deleting, by the processor, at least one part of the string in response to the length of the string being longer than the maximum character string length.

11. The deep learning based method of claim 1, wherein converting the bytecodes into the third data set comprises:
extracting, by the processor, a bytecode related to the contract address,
dividing, by the processor, the extracted bytecode by a predetermined unit,
performing, by the processor, integer encoding on the divided bytecode, and
inserting, by the processor, the result of integer encoding into the second set of integers.

12. The deep learning based method of claim 11, wherein converting the bytecodes into the third data set comprises:
adding, by the processor, a predetermined character to the one or more bytecodes to a length of the one or more bytecodes being shorter than a predetermined maximum character string length, and deleting, by the processor, at least one part of the one or more bytecodes in response to the length of the one or more bytecodes being longer than the maximum character string length.

13. The deep learning based method of claim 1, wherein running the pre-learned deep learning module of the processor using the second data set to extract the second feature vector comprises:
applying, by the processor, the second data set to a first pre-learned convolutional neural network,
applying, by the processor, a first maxpooling to a first value that has passed through the first convolutional neural network,
applying, by the processor, the second data set to a second pre-learned convolutional neural network,
applying, by the processor, a second maxpooling to a second value that has passed through the second convolutional neural network,
applying, by the processor, a softmax function to a third value to which the second maxpooling is applied, and
calculating, by the processor, an element-wise product of a first intermediate value to which the first maxpooling is applied and a second intermediate value to which the softmax function is applied.

14. The deep learning based method of claim 1, wherein running the pre-learned deep learning module of the processor using the third data set to extract the third feature vector comprises:
applying, by the processor, the third data set to a first pre-learned convolutional neural network,
applying, by the processor, a first maxpooling to a first value that has passed through the first convolutional neural network,
applying, by the processor, the third data set to a second pre-learned convolutional neural network,
applying, by the processor, a second maxpooling to a second value that has passed through the second convolutional neural network,
applying, by the processor, a softmax function to a third value to which the second maxpooling is applied, and
calculating, by the processor, an element-wise product of a first intermediate value to which the first maxpooling is applied and a second intermediate value to which the softmax function is applied.

15. A system for detecting abnormal cryptocurrency transactions between computing devices in a blockchain network, the system comprising:
a communication interface configured to establish a communication link with a plurality of computing devices in the blockchain network,
the plurality of computing devices comprising a first computing device associated with a first user wallet address and one or more second computing devices associated with one or more second user wallet addresses;
a memory configured to store:
one or more transaction data of transactions between the first user wallet address and at least one of the one or more second user wallet addresses,
one or more input codes associated with the transactions between the first user wallet address and the at least one of the one or more second user wallet addresses, and
one or more bytecodes associated with distributing the one or more input codes in the blockchain network; and
a processor configured to:
generate a first data set associated with the first user wallet address based at least in part on the one or more transaction data, the first data set comprising a set of normalized statistical features of the one or more transaction data;
convert the one or more input codes into a second data set associated with the first user wallet address, the second data set comprising a first set of integers;
convert the bytecodes into a third data set associated with the first user wallet address, the third data set comprising a second set of integers;
run a pre-learned deep learning module using the first data set associated with the set of normalized statistical features to extract a first feature vector, the first feature vector comprising a first new feature generated by correlating adjacent statistical features in the first data set;
run the pre-learned deep learning module using the second data set associated with the one or more input codes to extract a second feature vector, the second feature vector comprising a second new feature data generated by correlating adjacent input codes in the second data set;
run the pre-learned deep learning module using the third data set associated with the one or more bytecodes to extract a third feature vector, the third feature vector comprising a third new feature data generated by correlating adjacent bytecodes in the third data set,
wherein a first number of layers are used in the pre-learned deep learning module that extracts the third feature vector by using the one or more bytecodes,
wherein a second number of layers are used in the pre-learned deep learning module that extracts the second feature vector by using the one or more input codes,
wherein the first number of layers are greater than the second number of layers in order to compensate a detection performance that would be lower in the pre-learned deep learning module that uses the one or more bytecodes than in the pre-learned deep learning module that uses the one or more input codes, and
wherein the detection performance comprises:
an accuracy performance representing a matching rate between a label value of the second or third data set and a predicted value of the pre-learned deep learning module for fraudulent cryptocurrency transaction detection, and
a precision performance representing a ratio of a case as actually labeled fraudulent cryptocurrency transaction to all cases determined by the pre-learned deep learning module to be fraudulent cryptocurrency transaction;
combine the first feature vector, the second feature vector, and the third feature vector into an intermediate value, by:
concatenating the first feature vector, the second feature vector, and the third feature vector into a concatenated vector,
performing layer normalization on the concatenated vector,
applying a layer normalized value to a feed-forward network, and deriving the intermediate value obtained by adding a value that has passed through the feed-forward network to the concatenated vector; and run the pre-learned deep learning module using the intermediate value to determine the fraudulent cryptocurrency transaction in the blockchain network by:

comparing the intermediate value to a predetermined reference value stored in the memory; and determining a fraudulent activity in the transaction between the first wallet address and the at least one of the one or more second user wallet addresses in response to the intermediate value being greater than the predetermined reference value, by using a binary classification model that classifies the transaction as one of a fraudulent cryptocurrency transaction or a normal cryptocurrency transaction based on a comparison of the intermediate value and the predetermined reference value, in running the pre-learned deep learning module to extract the first feature vector, the processor configured to apply an importance weight gate to the first data set associated with the set of normalized statistical features by:

applying a linear artificial neural network (ANN) to the first data set to generate a first result value, the first result value representing an initial statistical feature, applying the first data set to a pre-learned convolutional neural network (CNN), applying maxpooling to a value that has passed through the convolutional neural network to reduce a dimension of a hidden state vector and not to consider elements of relatively low importance among statistical feature values, applying a softmax function to a value that has passed through the maxpooling to generate a second result value, the second result value representing a numerical value of how much each statistical feature among the set of normalized statistical features is weighted on detecting whether there is a fraudulent cryptocurrency transaction, and multiplying the first result value and the second result value to generate an element-wise product, wherein the element-wise product enables a higher weight to be given to a statistical value that plays a more important role in detecting the fraudulent cryptocurrency transaction, and wherein the feed-forward network comprises two or more linear artificial neural networks and two or more leaky ReLU functions alternately arranged with respect to each other, in applying the layer normalized value to the feed-forward network, the processor configured to:

feed the layer normalized value into a first linear artificial neural network of the two or more linear artificial neural networks, feed an output of the first linear artificial neural network into a first leaky ReLU function of the two or more leaky ReLU functions, feed an output of the first leaky ReLU function into a second linear artificial neural network of the two or more linear artificial neural networks, and feed an output of the second linear artificial neural network into a second leaky ReLU function of the two or more leaky ReLU functions.

16. A non-transitory computer-readable recording medium storing instructions, when executed by one or more processors, causing the one or more processors to perform the method of claim 1.

17. The deep learning based method of claim 1, wherein:

the first data set is generated by:

retrieving, from the memory of the fraud detection server, a set of transaction data of the one or more transaction data associated with the first user wallet address, deriving a set of statistical features based on the set of transaction data, and converting the set of statistical features into the set of normalized statistical features, the set of normalized statistical features comprising a label value indicating a fraudulent cryptocurrency transaction or a normal cryptocurrency transaction in the blockchain network;

the one or more input codes are converted into the second data set by:

retrieving, from the memory, a set of transaction data of the one or more transaction data associated with the first user wallet address, extracting a set of input codes of the one or more input codes included in the set of transaction data, concatenating the set of input codes into a string, dividing the string by a predetermined unit to generate a divided string, performing integer encoding on the divided string, and inserting the result of integer encoding into the first set of integers, the first set of integers comprising a label value indicating a fraudulent cryptocurrency transaction or a normal cryptocurrency transaction in the blockchain network; and the bytecodes are converted into the third data set by:

extracting a set of bytecodes of the one or more bytecodes associated with the contract address, dividing the set of bytecodes by a predetermined unit, performing integer encoding on the divided set of bytecodes, and inserting the result of integer encoding into the second set of integers, the second set of integers comprising a label value indicating a fraudulent cryptocurrency transaction or a normal cryptocurrency transaction in the blockchain network.

18. The deep learning based method of claim 1, wherein running the pre-learned deep learning module to extract the second feature vector comprises applying an importance weight gate to the second data set associated with the one or more input codes by:

applying, by the processor, a first pre-learned convolutional neural network (CNN) to the second data set to generate a first value, applying, by the processor, maxpooling to the first value to generate a first intermediate value, applying, by the processor, a second pre-learned convolutional neural network (CNN) to the second data set to generate a second value, applying, by the processor, maxpooling to the second value to generate a third value;

applying, by the processor, a softmax function to the third value to generate a second intermediate value, and multiplying, by the processor, the first intermediate value and the second intermediate value to generate an element-wise product, wherein the element-wise product enables a higher weight to be given to a statistical value that plays a more important role in detecting the fraudulent transaction.

19. The deep learning based method of claim 1, wherein running the pre-learned deep learning module to extract the third feature vector comprises applying an importance weight gate to the third data set associated with the one or more bytecodes by:
   applying, by the processor, a first pre-learned convolutional neural network (CNN) to the third data set to generate a first value,
   applying, by the processor, maxpooling to the first value to generate a first intermediate value,
   applying, by the processor, a second pre-learned convolutional neural network (CNN) to the third data set to generate a second value,
   applying, by the processor, maxpooling to the second value to generate a third value,
   applying, by the processor, a softmax function to the third value to generate a second intermediate value, and
   multiplying, by the processor, the first intermediate value and the second intermediate value to generate an element-wise product,
   wherein the element-wise product enables a higher weight to be given to a statistical value that plays a more important role in detecting the fraudulent transaction.

20. The deep learning based method of claim 1, wherein concatenating the first feature vector, the second feature vector, and the third feature vector into the concatenated vector comprises:
   connecting a plurality of flows in a manner of combining different information flows of i) the set of normalized statistical features associated with the first data set, ii) the one or more input codes associated with the second data set, and iii) the one or more bytecodes associated with the third data set such that all of previously pre-processed statistical features, input codes, and bytecodes are considered in determining a fraudulent cryptocurrency transaction in the blockchain network.

* * * * *